(12) United States Patent
Givot

(10) Patent No.: US 9,734,533 B1
(45) Date of Patent: Aug. 15, 2017

(54) SYSTEM AND METHOD FOR OPERATING A STATE-BASED MATCHING ENGINE

(71) Applicant: Chicago Stock Exchange, Inc., Chicago, IL (US)

(72) Inventor: Steven I. Givot, Chicago, IL (US)

(73) Assignee: Chicago Stock Exchange, Inc., Chicago, IL (US)

( * ) Notice: Subject to any disclaimer, the term of this patent is extended or adjusted under 35 U.S.C. 154(b) by 0 days.

(21) Appl. No.: 15/178,167

(22) Filed: Jun. 9, 2016

Related U.S. Application Data

(63) Continuation of application No. 14/884,526, filed on Oct. 15, 2015.

(60) Provisional application No. 62/103,807, filed on Jan. 15, 2015.

(51) Int. Cl.
G06Q 30/08 (2012.01)
G06Q 40/04 (2012.01)

(52) U.S. Cl.
CPC ............ *G06Q 30/08* (2013.01); *G06Q 40/04* (2013.01)

(58) Field of Classification Search
CPC .................................................... G06Q 30/08
See application file for complete search history.

(56) References Cited

U.S. PATENT DOCUMENTS

| | | | |
|---|---|---|---|
| 7,606,759 B2 | 10/2009 | Swanson et al. | |
| 7,941,364 B2 | 5/2011 | Peterffy et al. | |
| 8,712,896 B2 * | 4/2014 | Sheldon | G06Q 40/06 705/35 |
| 8,781,944 B2 | 7/2014 | Olsson et al. | |
| 2001/0027434 A1 | 10/2001 | Alaia et al. | |
| 2002/0194115 A1 * | 12/2002 | Nordlicht | G06Q 40/04 705/37 |
| 2004/0210512 A1 * | 10/2004 | Fraser | G06Q 30/08 705/37 |
| 2005/0055305 A1 * | 3/2005 | Lutnick | G06Q 40/04 705/37 |

(Continued)

OTHER PUBLICATIONS

"Auction Rate Securities", Citigroup Inc., (2009), 14 pgs.

(Continued)

*Primary Examiner* — Robert R Niquette
(74) *Attorney, Agent, or Firm* — Schwegman Lundberg & Woessner, P.A.

(57) ABSTRACT

A system and method for operating an on-demand auction for a Financial Instrument are provided in which a request is made for a Trading Center to conduct an on-demand auction for a Financial Instrument. If requirements are met, the Trading Center transitions from an Open Trading State (OTS) to a SNAP Auction State (SAS), excludes from the auction any order which explicitly requests exclusion, includes in the auction any remaining Resting Orders, includes in the auction certain new orders which arrive before the auction ends, activates and includes currently dormant orders, takes a snapshot of displayed buying/selling interest and attempts to include in the auction any available buying/selling interest in other Trading Centers which must be satisfied, computes the auction price, sends external Satisfaction Orders, attempts to match all responses to Satisfaction Orders and all internal orders included in the auction, and transitions back from the SAS to the OTS.

4 Claims, 19 Drawing Sheets

(56) References Cited

U.S. PATENT DOCUMENTS

| | | | | |
|---|---|---|---|---|
| 2005/0137964 | A1* | 6/2005 | Nordlicht | G06Q 40/06 705/37 |
| 2010/0191640 | A1 | 7/2010 | Tilly et al. | |
| 2011/0066541 | A1 | 3/2011 | Hatheway et al. | |
| 2012/0179593 | A1* | 7/2012 | Sheldon | G06Q 40/04 705/37 |
| 2013/0066760 | A1* | 3/2013 | Sheldon | G06Q 40/04 705/37 |

OTHER PUBLICATIONS

"Auctionl On-Demand Auctions from PDQ ATS Bringing the Market to You", PDQ ATS Inc, [Online] Retrieved from the Internet : <http://www.pdqats.com/wpcontent/uploads/2013/10/Auction1_2014_WEB.pdf>, (Oct. 2013), 1 pg.

"Dark Liquidity", Wikipedia Foundation, Inc., [Online] Retrieved from the Internet: <http://en.wikipedia.org/wiki/Dark_liquidity>, (Jan. 20, 2015), 1 pg.

Finra, "Investor Education Series—Auction Rate Securities: What Happens When Auctions Tail", (Dec. 2011), 1-4.

Langager, C, "What is the difference between a quote driven market and an order driven one?", Investopedia, LLC., [Online] Retrieved from the Internet: <http://www.investopedia.com/ask/answers/06/quoteorderdrivenmarket.asp>, (Jan. 19, 2015), 1 pg.

Nguyen, J, "An Introduction to Securities Markets", Investopedia, LLC., [Online] Retrieved from the Internet: <http://www.investopedia.com/articles/stocks/11/securitiesmarket-introduction.asp>, (Jan. 19, 2015), 2 pgs.

Sargeant, N, "What is the difference between a broker and a market maker?", Investopedia, LLC., <http://www.investopedia.com/ask/answers/06/brokerandmarketmaker.asp>, (Jan. 19, 2015), 1 pg.

"U.S. Appl. No. 14/884,526, Non Final Office Action mailed Feb. 27, 2015", 8 pgs.

"U.S. Appl. No. 14/884,526, Response filed Jan. 31, 2017 to Restriction Requirement mailed Jan. 26, 2017", 10 pgs.

"U.S. Appl. No. 14/884,526, Restriction Requirement mailed Jan. 26, 2017", 10 pgs.

* cited by examiner

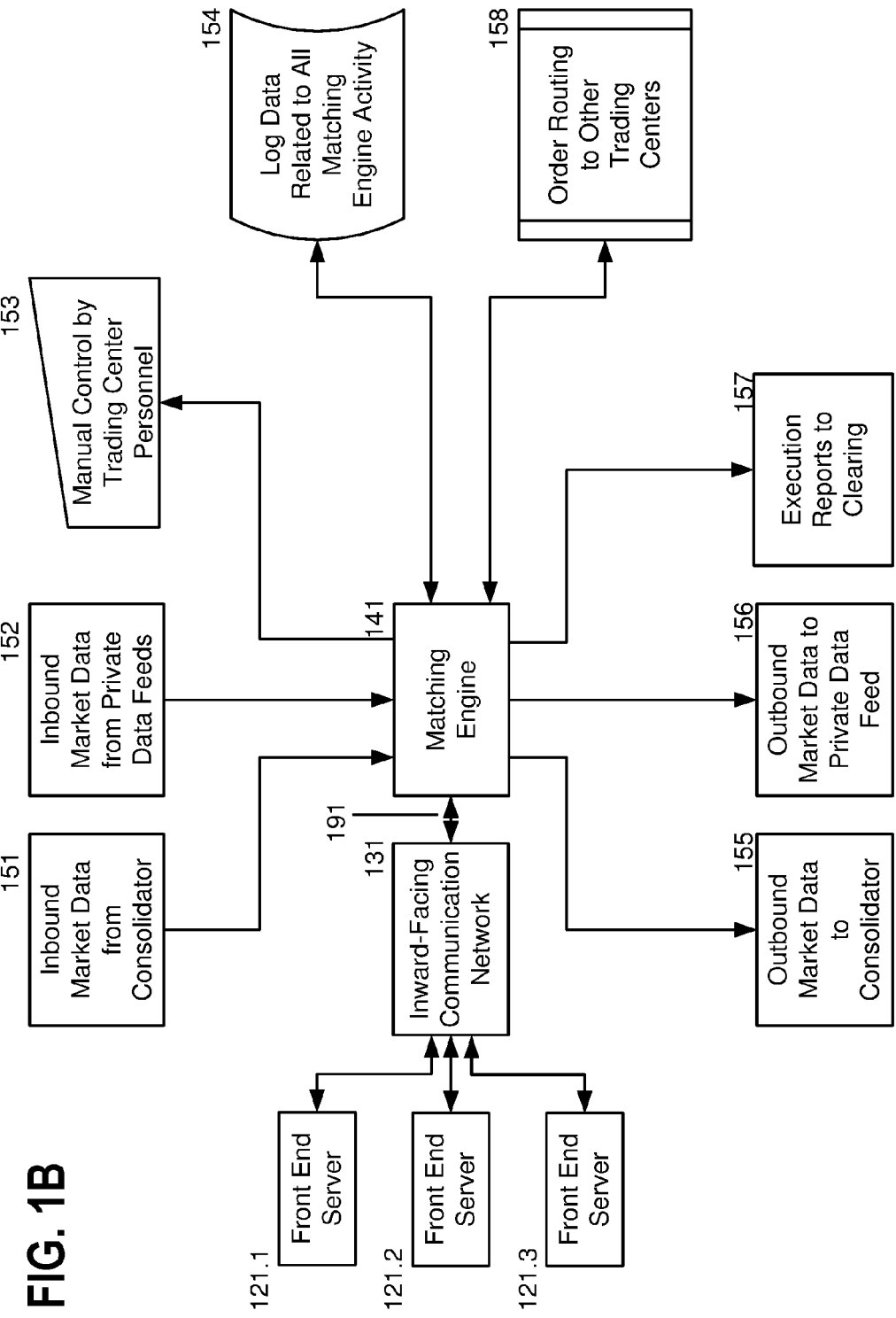

|  | REGULAR ORDER | ORDER WITH SNAP MODIFIER | ORDER WITH SNAP AUCTION ONLY MODIFIER | ORDER WITH CANCEL ON SNAP AUCTION MODIFIER |
|---|---|---|---|---|
| ORDER | M10 | M20 | M30 | M40 |
| CANCEL (OR CANCEL/ REPLACE) | M15 | M25 | M35 | M45 |

FIG. 2B

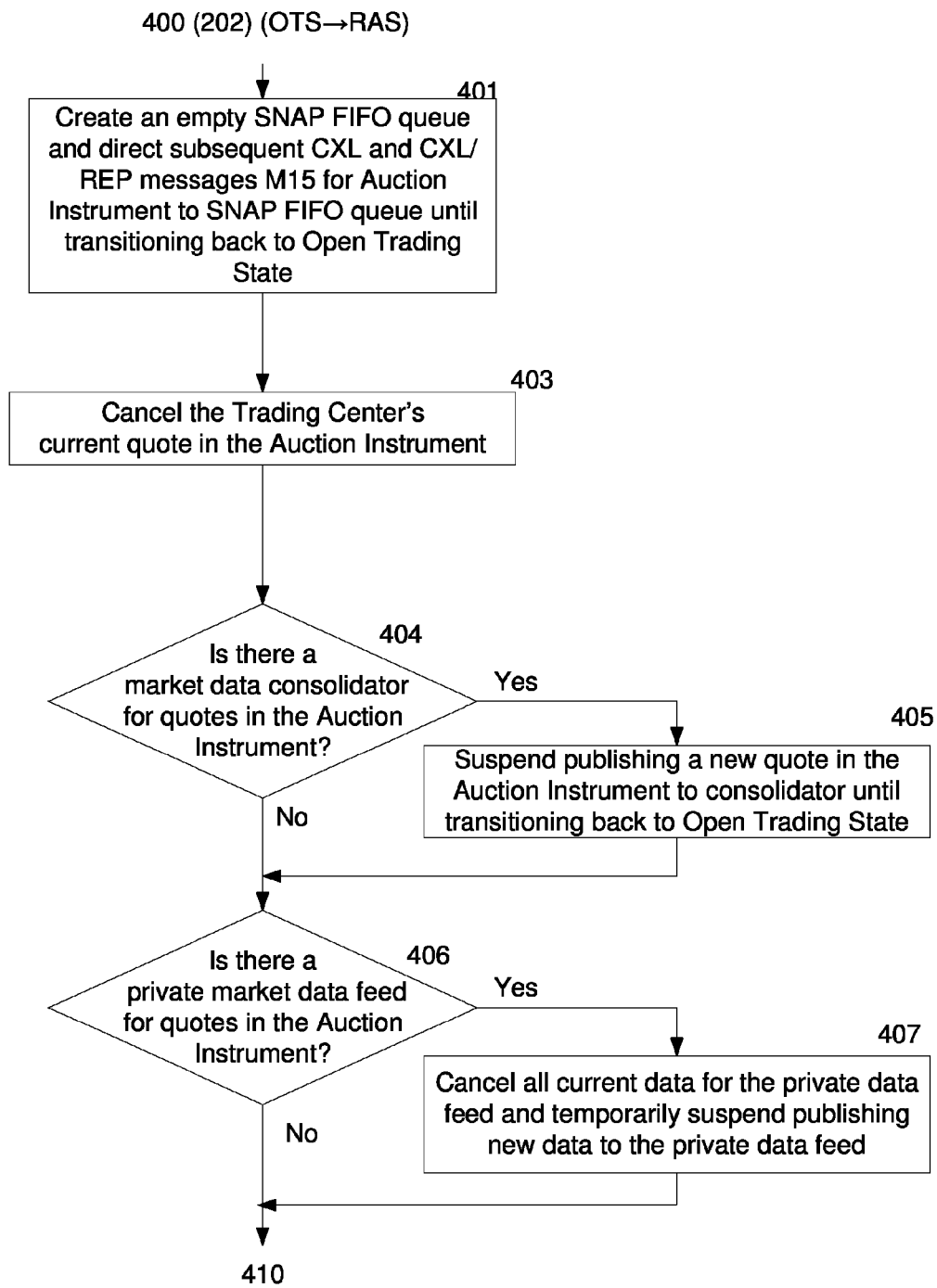

SYSTEM AND METHOD FOR OPERATING A STATE-BASED MATCHING ENGINE

CROSS REFERENCE TO RELATED APPLICATIONS

The present application is a continuation application of U.S. patent application Ser. No. 14/884,526, filed Oct. 15, 2015, entitled, "System and Method for Operating an On-demand Auction for a Financial Instrument", and also claims the benefit of U.S. Provisional Application No. 62/103,807, filed Jan. 15, 2015, entitled, "System and Method for Operating an On-demand Auction for a Financial Instrument", both herein incorporated by reference.

BACKGROUND

The system and method described below relate, in general, to automated, electronic trading of Financial Instruments and, more particularly, to a system and method for operating an on-demand auction in Financial Instruments.

In recent years, financial markets have evolved from largely manual processing of orders to fully automated, electronic processing of orders by computers. The automation has frequently been accompanied by reduced visible liquidity resulting in increased difficulty and increased cost in executing large orders. Frequently this is the result of intermediation by third parties which, in part, results from market fragmentation.

Historically, liquidity providers could manually interact with large orders without exposing those orders publicly. This historical process permitted a pool of liquidity to be gathered to help execute a large order with minimal information leakage.

Today, these liquidity providers and the manual approach to executing large orders have largely been replaced by automated liquidity providers who typically provide only a small amount of liquidity at a given price point and various algorithmic approaches to filling large orders by slicing them into minute pieces which seek to trade against today's liquidity providers in the small size typically available at any given time. These changes have complicated the ability to execute a transaction of large size.

Large orders sliced into many, many small orders by sophisticated algorithms can lead to information leakage. Other sophisticated algorithms—scanning for information leakage—detect large orders, step ahead of them, and often take on positions as intermediaries. When an intermediary steps ahead of a large order, the result is an adverse price movement for the large order. If the intermediary eventually provides liquidity for the large order, this process will have made it more expensive to complete the large order.

This has further been exacerbated by ever-faster response times by markets and some Market Participants. Shortened time frames make it difficult for many potential liquidity providers to react to a large order. This limits the pool of liquidity providers who are able to compete in today's environment. Reduced competition results in higher execution costs for large orders.

To address these problems, the marketplace needs a method for large natural buyers or sellers to attract significant liquidity pools with little to no information leakage—at least prior to the transaction. The new method must balance the conflict between giving potential liquidity providers sufficient time to react to the need for liquidity and minimizing interference with open trading which typically has response times measured in microseconds.

SUMMARY

Definition of Terms and Acronyms

The following definitions and acronyms are utilized in the following description.

| | |
|---|---|
| Auction Instrument | the particular Financial Instrument for which a SNAP Auction has been started. |
| Auction Price APr | a single price at which buy and sell orders in the Order Book can be matched during the auction. |
| Cancel On SNAP Order Modifier | this modifier indicates that the order should not participate in a SNAP auction, and the order is canceled when the auction begins. |
| Crossed or Crossed Order Book | the Order Book is crossed if the highest Working Price of any buy order is greater than the lowest Working Price of any sell order. |
| Financial Instrument | a tradable asset of any kind; either cash, evidence of an ownership interest in an entity, or a contractual right to receive or deliver cash or another Financial Instrument. |
| Limit Price | the maximum (minimum) price at which an order to buy (sell) may be executed consistent with the terms of that order. |
| Locked or Locked Order Book | the Order Book is locked if the highest Working Price of any buy order is equal to the lowest Working Price of any sell order. |
| LULD trading pause | A mechanism approved by the Securities and Exchange Commission, as part of a one year pilot to address extraordinary market volatility with a mechanism to prevent trades in NMS securities from occurring outside of specific price bands. The bands are be set at a percentage above and below the average reference price of the security over the immediately preceding five-minute period. To accommodate more fundamental price moves, a five minute trading pause - similar to the pause triggered by the current single stock circuit breakers - only if trading is unable to occur within the specified price band after 15 seconds. |
| Market Participant | an individual or entity to which a Trading Center grants permission to access one or more of the Trading Center's Matching Engines for the purpose of submitting order, cancellation, cancel/replace, or other messages. |
| Matching Engine | a computer system operated by a Trading Center which accepts orders to buy and sell Financial Instruments and attempts to match buyer with sellers at a price consistent with the terms required by the matched buyer and seller. |

-continued

| | |
|---|---|
| NBB | National Best Bid; the highest displayed bid price for a fungible Financial Instrument published by any Trading Center. |
| NBBO | National Best Bid and Offer; the combination of the NBB and the NBO. |
| NBBO Midpoint | the average of the NBB price and the NBO price, when both exist and NBB ≤ NBO (i.e., the NBBO is not crossed). Otherwise the NBBO Midpoint is undefined. |
| NBO | National Best Offer; the lowest displayed offer price for a fungible Financial Instrument published by any Trading Center. |
| Open Trading State (OTS) | a state of the Matching Engine is in for a given Financial Instrument in which the Matching System can accept and match orders to buy and sell interests in that Financial Instrument. During any auction (include a SNAP auction), during a trading halt, during an LULD trading pause, or outside of trading hours, the Matching Engine is not able to accept and matching orders without transitioning to another state and, therefore, these are not Open Trading States. |
| Order Book | the collection of all currently active orders held in a Matching Engine which are currently eligible to be matched. |
| Pegged Order | an order for which the Working Price is based on current market quotations. For example, a pegged order is priced based on the NBB, NBO, NBBO midpoint, possibly with some differential from one of these. |
| Reg NMS or Regulation NMS | a body of rules and regulations adopted by the United States Securities and Exchange Commission which govern the trading in Reg NMS (National Market System) Securities on national securities exchanges and over-the-counter markets in the United States. |
| Reg NMS Securities | securities which trade subject to Reg NMS. |
| Reg SHO or Regulation SHO | a body of rules and regulations adopted by the United States Securities and Exchange Commission which govern short sale of Reg NMS securities. |
| Set-aside Orders | orders which the Matching Engine may set aside and not match during the SNAP Auction Matching Process. Set-aside Orders are set aside to be matched or cancelled based on responses to Satisfaction Orders which were not received before the end of the SNAP Auction Satisfaction Period. The aggregate Order Quantity of all Set-aside Orders set aside for this purpose is equal to the aggregate Order Size for which the Matching Engine has not received a response before the end of the SNAP Auction Satisfaction Period. |
| Resting Order | an order currently held in a Matching Engine and available for matching. |
| Satisfaction Order | an order sent by Trading Center A to satisfy a quotation from Trading Center B for the purpose of satisfying a bid or offer published by Trading Center B when required by rules or regulations. Sending Satisfaction Orders under such circumstances is a requirement of Reg NMS and may be a requirement of rules and regulations governing trading in other Financial Instruments. All Satisfaction Orders are marked immediate-or-cancel (IOC) so that Trading Center B can be expected to respond with some combination of execution and/or cancellation messages upon receipt. |
| SNAP | Sub-second Non-Disclosed Auction Period (or Process) |
| SNAP Auction | an on-demand auction for a particular Auction Instrument which occurs only on request of someone sending the Matching Engine a SNAP Order and, then, only when certain conditions have been met which permit the Matching Engine to accept the SNAP Order. |
| SNAP Auction Cycle | a series of states which the Matching Engine enters in a prescribed sequence to conduct a SNAP Auction. |
| SNAP Auction Only Order | an order having an order modifier which a Matching Engine may support. A SNAP Auction Only Order is an order which is active (i.e., eligible for matching) only during certain states comprising a SNAP Auction. At all other times, a SNAP Auction Only Order is inactive (i.e., ineligible for matching). |
| SNAP Auction Only Order Pricing Algorithm | an algorithm supported by the Trading Center which can be used to price a SNAP Auction Only Order at the time that it is activated. One of many possible algorithms which could be used to price a SNAP Auction Only Order pricing the orders as a Pegged Order whose Working Price is calculated during the SNAP Auction Cycle. |
| SNAP Auction State (SAS) | any state of the Matching Engine which is part of the SNAP Auction Cycle. |
| SNAP Order | an order having an order modifier which a Matching Engine supports. A SNAP Order is an order which is submitted to Request an Auction Period. |
| Trading Center | an enterprise which operates one or more Matching Engines. |
| Working Price | the most aggressive price at which an order can currently be matched. For a Pegged Order, the Working Price is typically calculated at the time of matching. However, for a SNAP Auction Only Order which is a Pegged Order, the Working Price is calculated at a specific point in the SNAP Auction Cycle (see below) and remains constant for the duration of the current SNAP Auction. Under Reg NMS, the Working Price of an order may be constrained by Limit Up/Limit Down price bands or | by the current NBB or NBO (price sliding orders). Under Reg SHO, the Working Price of an order to sell short may be constrained when the Reg SHO short sale restriction is in effect.

An automated system and method are described below for operating an on-demand auction for a Financial Instrument within a Matching Engine which—in addition to supporting other Matching Engine functionality—is specifically programmed to support conducting on-demand SNAP Auctions as described in this document including support of the order modifiers described in this document.

This system and method advantageously permit sub-second auctions to take place because they provide for collecting a pool of liquidity for orders within a memory storage unit of a trading center matching engine in the form of auction-only orders before the auction takes place. Utilizing the pre-pooled orders for the auction permits for a very rapid and efficient mechanism to execute orders that has not previously been available.

These auction only orders can be algorithmically priced, utilizing a processor and software routines necessary to achieve the speed necessary, and the orders, which are prioritized in a memory queue of the matching engine within a given price based on their initial time of receipt (such orders are queued/pooled ahead of time, and can be received/queued be hours before the auction takes place). The liquidity created by this prior pooling permits a large number of orders to participate in the auction quickly in a manner not previously achievable. Thus, a pool of liquidity is first built, and then an auction is accepted (or, in an embodiment, automatically initiated) using this liquidity previously developed to satisfy it.

The prioritizing of orders based on their time of initial receipt prevents a race for access to the auction when the auction is announced, as is typically the case. In the known auctions, such auctions are announced, and high frequency traders can rush in and access the auction in milliseconds, creating a speed race. Advantageously, the present system allows buyers and sellers who are willing to name their price, even algorithmically, early in the day, at that price, to end up being ranked in front of people who come in after the auction has been announced.

The system and method are provided within a Trading Center's Matching Engine which is programmed to permit a Market Participant to request that Matching Engine to conduct an on-demand auction in which the Market Participant is committed to buy or sell up to a specified Order Quantity of a specified Financial Instrument—the Auction Instrument—at a price no more aggressive than a specified Limit Price. All subsequent references to the Matching Engine in this document refer to a Matching Engine which is programmed to support an automated system and method for operating an on-demand auction. The order modifier which seeks to request a sub-second non-disclosed auction period is called a SNAP Order. If the Matching Engine determines that a particular SNAP Order meets all prerequisites that are either required by the system or method described herein or set by the Trading Center as part of the Trading Center's embodiment, the Matching Engine initiates an on-demand SNAP Auction for that Financial Instrument.

Once the Matching Engine responds to a SNAP Order by initiating a SNAP Auction for a Financial Instrument, there is no way to terminate the SNAP Auction without the Matching Engine entering into a series of activities which comprise the SNAP Auction Cycle. The SNAP Auction Cycle includes each of the following activities completed in the following sequence:

Snap Auction Cycle—Transition to Snap Auction State

The following actions take place atomically. That is, they are not interrupted by another other activity related to the Auction Instrument such as inbound orders, cancels, cancel/replaces, or other messages relating to the Auction Instrument.

First, the Matching Engine transitions from an Open Trading State into a SNAP Auction State. This requires steps to assure that there is no information leakage during the conduct of the SNAP Auction (e.g., withdrawing or terminating certain real time public or private market data publication). Market Participants have no visibility as to the set of orders participating in the SNAP Auction other than the displayable portion of orders present and visible at the moment when the SNAP Order is first received and the displayable portion of orders present after the SNAP Auction Cycle has completed and the Open Trading State is once again active.

The Matching Engine temporarily suspends real time dissemination of certain market data for the Auction Instrument. Specifically, the Matching Engine temporarily suspends publication of the Trading Center's current published quote and contents of its Order Book. The Matching Engine then publishes updated quote and Order Book data reflecting no current quote and an empty Order Book. The effect of these actions is to make whatever happens within the Matching Engine during the rest of this SNAP Auction invisible to anyone other than the Trading Center itself. Updating this market data and continuing timely updates of it is resumed during the transition back to the Open Trading State as described below.

The Matching Engine temporarily suspends immediate processing of new messages to cancel cancel/replace orders. These messages are queued for processing when the SNAP Auction is completed during the transition back to the Open Trading State occurs as described below.

The Matching Engine temporarily suspends immediate matching of new orders to buy and sell for the purpose of accumulating such orders to achieve a single price auction—the SNAP Auction. As a result, the Order Book can subsequently contain Resting Orders which result in a Locked Book or Crossed Book because Resting Orders will not automatically match with any other order. Real-time matching of new orders resumes during the transition back to the Open Trading State as described below.

The Matching Engine cancels each Resting Order which contains a CANCEL ON SNAP AUCTION order modifier. This modifier indicates that the order should not participate in a SNAP auction.

Its use is advantageous because if an order is sitting in the order book beforehand and the person placing the order does not want to be locked in for the time period of an auction (because cancels are not allowed during the auctions, and someone who has submitted a limit price order that is resting in the book may not want to be subject to adverse market movement while being unable to cancel that order during a SNAP Auction), the order can be originally submitted with a cancel on SNAP auction order modifier. If this is the case, the order is automatically canceled by the Matching Engine when a SNAP auction occurs. Put simply, this modifier allows one to participate in the market with their order, but not be forced to go into an auction which comes upon the order with no warning.

At this step of the SNAP Auction Cycle, the Order Book contains those orders which were present in the Order Book when the SNAP Order was received and which will participate in this SNAP Auction.

The Matching Engine electronically announces the start of the SNAP Auction Cycle to make Market Participants aware that the SNAP Auction is underway in the Auction Instrument. The method for doing this will depend on the market structure related to the Auction Instrument and the available mechanisms to do so. Aside from the Auction Instrument, the Matching Engine provides no information about the terms of the SNAP Order. Specifically, Market Participants are not told whether the SNAP Order seeks to buy or sell the Auction Instrument, the SNAP Order's Quantity, or the SNAP Order's Limit Price.

In certain embodiments, the Trading Center and/or Market Participant which submitted the SNAP Order may elect to provide limited information about the SNAP Order's Quantity to facilitate attracting responses to the SNAP Auction which provide sufficient size to complete the SNAP Order. For example, an embodiment may include with the electronic announcement an indication of the size range of the SNAP Order (e.g., the SNAP Order is between 100,000 and 200,000 shares).

Snap Auction Cycle—Snap Auction Period

Second, the SNAP Auction Period takes place.

The SNAP Auction Period is a period of time when the Matching Engine will accept additional orders to participate in the SNAP Auction. The SNAP Auction Period is in effect for a fixed time period determined by the Trading Center. In certain embodiments, the Trading Center may incorporate a (positive or negative) random component to the SNAP Auction Period which can shorten or lengthen a SNAP Auction somewhat. The purpose of the random component is to minimize any last minute flurry of orders by introducing the possibility of missing participation in the SNAP Auction if a Market Participant waits for the last possible moment to submit an order to participate in the SNAP Auction.

New orders go directly into the Order Book as Resting Orders, with three exceptions.

The first exception is that any order marked CANCEL ON SNAP AUCTION will be cancelled upon receipt.

The second exception is that any new SNAP Auction Only Order will join any previously-submitted SNAP Auction Only Orders for the Auction Instrument waiting to be activated and added to the Order Book later in the SNAP Auction Cycle.

The third exception is that a SNAP Order which requests a SNAP Auction will be treated as a SNAP Auction Only Order of the size and with the Limit Price specified on the SNAP Order. A SNAP Order received at this time will not be tested to determine whether it would have met the requirements to initiate a SNAP Auction. A SNAP Order received at this time will be set to expire at the end of the current SNAP Auction.

When the allotted time for the SNAP Auction Period expires, the Matching Engine begins to queue new order messages which arrived too late to participate in the SNAP Auction as well as continuing to queue cancellation and cancel/replace messages. These message types continue to be queued until the contents of the queue is processed in FIFO sequence during the transition back to the Open Trading State as described below.

Snap Auction Cycle—Snap Auction Pricing Process

Third, the Matching Engine conducts the SNAP Auction Pricing Process.

Before going into the pricing process, a check is made to make sure that certain things remain in place, i.e., the criteria to start the auction: there has to be a two-sided quote, the stock cannot be halted for regulatory reasons (a regulatory trading halt or trading pause), the two-sided quote cannot be a crossed market (i.e., where the bid price is greater than the ask price), and outbound routing services must be available.

If required by rule or regulation (e.g., Reg NMS), the Matching Engine takes a snapshot of quotes which may exist at other Trading Centers for which the Matching Engine may be required to send Satisfaction Orders. For example, in the case of Reg NMS Securities, the snapshot would include the protected quotes from other Trading Centers which go into calculating the NBBO.

At this point, each SNAP Auction Only Order which exists for the Auction Instrument is inactive. The Matching Engine now activates each such order. As part of the process of activating each SNAP Auction Only Order, Trading Center applies an algorithm specified as part of the SNAP Auction Only Order to calculate the Working Price of each such SNAP Auction Only Order. When the Working Price of each order is calculated, that order is added to the Order Book being ranked at its Limit Price and ranked among other SNAP Auction Only Orders based on the time the order was initially submitted to the Trading Center. When each such order has been activated and placed in the Order Book, the Order Book augmented with displayed orders from other Trading Centers which may require the Trading Center to send a Satisfaction Order comprises the complete set of all bids and offers which are eligible for inclusion in the SNAP Auction.

The Matching Engine now calculates the SNAP Auction Price APr as a single price at which buy and sell orders in the Order Book can be matched. During this process, the Matching Engine assumes that bids and offers in other Trading Centers will be satisfied by sending Satisfaction Orders, and the Matching Engine takes those bids and offers into consideration in determining the SNAP Auction Price. All orders in the Order Book are ranked based on their Working Price and therefore, applicable rules and regulations constraining the execution prices of an order (e.g., Reg NMS and Reg SHO for a Reg NMS Security) are reflected in the calculation of the SNAP Auction Price. The SNAP Auction Price will always set so that, if all Satisfaction Orders are fully executed, when those executions are allocated to Resting Orders and the remaining Resting Orders are matched at the SNAP Auction Price, the remaining Order Book will be neither Locked nor Crossed. In certain instances, there may be more than one Auction Price at which all of the conditions above can be met. The present system and method allow for the Trading Center to determine which of multiple possible SNAP Auction Prices to use under such circumstances.

After the SNAP Auction Price is established, the Matching Engine sends Satisfaction Orders to other Trading Centers if required to do so by rules and regulations.

The Matching Engine may also include in the category of Satisfaction Orders additional orders which are not required to be sent by rules or regulations. These additional Satisfaction Orders—if executed—would allow the SNAP Auction to match more size at the SNAP Auction Price. These additional Satisfaction Orders would always be priced at the SNAP Auction Price and marked as Satisfaction Orders. An example of this would be when a SNAP Order seeks to sell 100,000 shares, 99,000 shares can be matched at a SNAP Auction Price of 20.00, there are no additional Resting Orders to pay 20.00, but another Trading Center is bidding $20.00 for 4,000 shares. The Matching Engine would send a Satisfaction Order to the other Trading Center to sell 1,000 shares at 20.00 to complete the execution of the SNAP Order. Although rules and regulations may not define the order to sell 1000 shares at a price of 20.00 as a Satisfaction Order, the handling of this order after it is sent is treated in the same manner as a Satisfaction Order.

Snap Auction Cycle—Snap Auction Satisfaction Period

Fourth, the Matching Engine now waits briefly to provide an opportunity for other Trading Centers to respond to any Satisfaction Orders which were sent at the end of the SNAP Auction Pricing Process.

If no Satisfaction Orders were sent during the SNAP Auction Pricing Process, the SNAP Auction Satisfaction Period is skipped.

If one or more Satisfaction Orders were sent, the Matching Engine waits up to, but not longer than, a fixed period of time for a complete response to each Satisfaction Order. A complete response to a Satisfaction Order has been received when the Satisfaction Order's Order Quantity has been fully accounted for by the aggregate size reflected in execution reports and/or cancellation reports received in response to the Satisfaction Order from the Trading Center to which the Satisfaction Order was sent.

If a complete response to all Satisfaction Orders is received prior to the expiration of the fixed period of time, the SNAP Auction Satisfaction Period ends immediately. There is no reason to further delay completion of the SNAP Auction Cycle.

If the fixed period of time expires before a complete response is received to all Satisfaction Orders, the SNAP Auction Satisfaction Period ends, and the Matching Engine continues without having received a complete response from each Satisfaction Order.

Snap Auction Cycle—Snap Auction Order Matching Process

Fifth, the Matching Engine allocates execution reports for Satisfaction Orders to orders in the Order Book, sets aside Reserve Orders of sufficient size to assign to the possible execution of Satisfaction Orders with incomplete responses, and matches remaining orders in the Order Book to the greatest extent possible.

If Satisfaction Orders were sent and execution reports received for some or all of those orders, the Matching Engine allocates the execution of Satisfaction Orders to orders in the Order Book using a methodology determined by the Trading Center. Different embodiments may utilize different methodologies to do so.

If complete responses to all Satisfaction Orders were not received, the Matching Engine sets aside Set-aside Orders to be executed upon receipt of subsequent Satisfaction Order execution reports or to be cancelled upon receipt of subsequent Satisfaction Order cancellation reports. Different embodiments may utilize different methodologies to do so.

The Matching Engine then matches all remaining orders at the Auction Price to the extent that is possible.

At this point in the process, the resulting Order Book is neither locked nor crossed.

Snap Auction Cycle—Transition to Open Trading

The sixth and final step in the SNAP Auction Cycle is transitioning to the Open Trading State.

The Matching System evaluates each remaining active SNAP Auction Only Order in the Order Book. This may include orders which are partially executed or entirely unexecuted. Those SNAP Auction Only Orders which were submitted to participate in only one SNAP Auction have done so and are now cancelled. Those SNAP Auction Only Orders which were submitted to participate in multiple SNAP Auctions are removed from the Order Book, made inactive, and held by the Trading Center for participation in any subsequent SNAP Auction for the Auction Instrument.

The Matching Engine resumes real time processing of order, cancel, and cancel/replace messages. New messages are placed in the FIFO queue created and described above. All queued order, cancel, and cancel/replace messages which have been queued during the SNAP Auction Cycle are now processed in the sequence in which they were received until the queue is empty.

At this time no information regarding the current quote or the contents of the Order Book for the Auction Instrument has been disseminated. The Trading Center has no published quote for the Auction Instrument. The Order Book for the Auction Instrument appears to the outside world to be empty.

The Matching Engine now publishes its current quote and that portion of the Order Book which it would normally publish during the Open Trading State. Once the current quote and Order Book contents have been published (if Order Book data is normally published), the Matching Engine resumes real time publication of changes to the Auction Instrument's current quote and changes to the contents of the Order Book (if Order Book data is normally published).

This returns the Auction Instrument to the same state of transparency which existed when the transition to the SNAP Auction State began.

New order, cancel, and cancel/replace messages are now processed without using the FIFO queue established during the SNAP Auction State.

The Matching Engine has now been returned to the Open Trading State.

Snap Auction—A "Dark" Auction

A SNAP Auction allows any Market Participant to participate without the adverse effects of information leakage related to that Market Participant's involvement in the SNAP Auction. All aspects of the internal operation of the SNAP Auction are "dark" other than the published last sale reports resulting from the SNAP Auction and execution reports sent to individual Market Participants for executions made during the SNAP Auction. The Trading Center's Matching Engine publishes no quote or Order Book information during a SNAP Auction to any external market data feed. During the SNAP Auction Cycle the published quote is no bid, no offer. During the SNAP Auction Cycle, the contents of the Order Book are publishes as empty.

Even the details of the SNAP Auction Order which initiated the SNAP Auction remain confidential at all times. The existence of and all details of any SNAP Auction Only Order that was eligible for participation in the SNAP Auction remain confidential at all times because the SNAP Auction Only Order is only active during that portion of the SNAP Auction Cycle when no quote or Order Book data is published.

Snap Auction—Embodiments to Comply with Rules and Regulations

Various embodiments may exist to comply with the rules and regulations of the marketplace for a given Financial Instrument.

For example, if the Auction Instrument is a Reg NMS Security, Reg NMS and Reg SHO apply to trading in the Auction Instrument.

Reg NMS Rule 611 prohibits trading through a protected quotation without satisfying that protected quotation. Satisfaction is provided by sending the Trading Center which published the protected quotation a Satisfaction Order which is marked as an Intermarket Sweep Order (ISO). Thus, an embodiment applied to a Reg NMS Security trading in the United States would require that the system must send a Satisfaction Order to satisfy each protected quotation which the SNAP Auction Price would trade through. However, trading in futures contracts is not governed by a regulatory framework prohibiting trading through a quote published by another Trading Center, so an embodiment applied to gold futures contracts would not include procedures to send Satisfaction Orders to another Trading Center.

The proposed Tick Test Pilot Program includes at trade-at provision for Test Group 3 securities. If that is in effect for an Auction Instrument, the SNAP Auction may be required to send Satisfaction Orders compliant with that requirement as well.

Reg SHO places limitations on the execution price of orders to sell Reg NMS securities short when the Short Sale Restriction is in effect. Under those circumstances, the pricing of certain orders during a SNAP Auction will have to be compliant with this Reg SHO limitation.

Order Modifiers

Order modifiers are used to modify order types (e.g., LIMIT orders or MARKET orders). Three order modifiers should be supported by a Matching Engine which implements system and method described herein. These are: (1) the SNAP order modifier, (2) the SNAP Auction Only order modifier, and (3) the Cancel on SNAP Auction order modifier.

Order Modifiers—Snap Order Modifier

A SNAP Order is a Limit Order with a SNAP order modifier. A SNAP Order is used to Request an Auction Period. A SNAP Auction can only begin if a SNAP Order is sent by a Market Participant to request the on-demand SNAP Auction and if the SNAP Order meets the criteria established by the Trading Center to initiate a SNAP Auction.

Order Modifiers—Snap Order Modifier—Required Terms

A SNAP Order should include at least the following terms: the Auction Instrument which defines the Financial Instrument to be purchased or sold in the SNAP Auction; Order Side which is stated as buy or sell with possible additional information (e.g., short sale, short exempt sale, opening, closing, covered, uncovered); Order Quantity which indicates the number of shares, contracts, or other unit of trading to be bought or sold; and Limit Price which is the maximum (minimum) price at which to buy (sell).

Order Modifiers—Snap Order Modifier—Conditions for Acceptance which are Inherent to the System and Method Described Herein The system and method described herein imposes four requirements necessary for the Trading Center to accept a SNAP Order and begin the SNAP Auction Cycle.

First, there can only be one SNAP Auction Cycle underway at a time for each Auction Instrument. If a new SNAP Order is received by the Matching Engine for a given Auction Instrument and a SNAP Auction Cycle is currently underway for that Auction Instrument, the Matching Engine's response to the new SNAP Order for that Auction Instrument depends on when it is received. If the new SNAP Order is received prior to the end of the SNAP Auction Process, the SNAP Order is treated as a SNAP Auction Only Order and is eligible to participate in the SNAP Auction already underway. If the subsequent SNAP Order is received after the end of the SNAP Auction Process, the Matching System rejects the new SNAP Order.

Second, a SNAP Order can only be accepted by the Matching System if the Auction Instrument is currently available for trading (i.e., in an Open Trading State). If a SNAP Order is received for an Auction Instrument prior to the start of trading for the Auction Instrument, after the close of trading for the Auction Instrument, or when a trading halt is underway for the Auction Instrument, the Matching System must reject a SNAP Order.

Third, if the rules and regulations governing the Auction Instrument would prevent the execution of the SNAP Auction Order at the best visible bid (offer) price for a SNAP Order to sell (buy) based on the order's terms, the SNAP Order must be rejected. One example of this would be a SNAP Order to sell short shares of a Reg NMS Security in the US at a time when the Reg SHO short sale restriction is in effect. Note that the Reg SHO short sale restriction prevents execution of a short sale at that price. Another example of this would be SNAP Order to buy shares of a Reg NMS Security in the US at a time when there was no visible offer price for the Auction Instrument below the Reg NMS Limit Up/Limit Down upper price band.

Fourth, there must be sufficient time remaining during the Trading Center's current trading session to complete the SNAP Auction prior to the end of the current trading session. If the Trading Center estimates that the maximum time required to complete a SNAP Auction Cycle is one second, then the Trading Center must reject any SNAP Order which is received less than one second prior to the scheduled end of the Trading Center's current trading session. The purpose of this requirement is to assure that the SNAP Auction is completed and the Matching System returned to the Open Trading State for the Auction Instrument prior to the end of the current trading session. The Trading Center may opt to have a greater period of time between the end of a SNAP Auction and the end of a trading session.

Order Modifiers—Snap Order Modifier—Additional Conditions for Acceptance Imposed by the Trading Center In its embodiment, the Trading Center may impose additional requirements to begin a SNAP Auction.

One additional requirement which the Trading Center might impose an embodiment is requiring a minimum size for the SNAP Order. When a SNAP Auction is underway, the Trading Center is unable to match incoming orders with resting orders its Order Book immediately. Thus running a SNAP Auction imposes an opportunity cost on the Trading Center. By requiring a minimum size for a SNAP Order to initiate a SNAP Auction, the Trading Center can prevent incurring this opportunity cost for a small SNAP Order.

Another additional requirement which the Trading Center might impose in an embodiment is preventing SNAP Auctions soon after the start or restart of trading. After the scheduled start of trading or the restart of trading after a trading halt, price fluctuations can be volatile. The Trading Center might elect to prohibit starting a SNAP Auction for a period of time after the start or restart of trading to reduce the likelihood that a SNAP Auction would occur during a period of price volatility.

Another additional requirement which the Trading Center might impose in an embodiment is preventing SNAP Auctions from starting too close to the scheduled end of trading or scheduled end of a trading session. This would be a requirement in excess of the requirement discussed above that is an inherent part of the system and method described herein. A SNAP Auction may result in transactions outside of the best visible bid and offer prices which exist at the time the SNAP Auction begins. Thus a SNAP Auction may result in temporary destabilization of prices for the Auction Instrument. The Trading Center might elect to prohibit starting a SNAP Auction close to the schedule end of trading or end of a trading session to avoid destabilizing prices immediately before the close of trading which, itself, can often consist of a potentially destabilizing closing auction. For example, if the estimated maximum duration of a SNAP Auction is one second, the Trading Center may elect to reject a SNAP Order which is received less than five minutes before the end of the current trading session.

Another additional requirement which the Trading Center might impose in an embodiment is preventing one SNAP Auction to take place shortly after a previous SNAP Auction in the same Auction Instrument has completed. Once again, a possible reason for this is to permit the market in the Auction Instrument to stabilize during the time period between one SNAP Auction and another in the same Auction Instrument.

Yet another additional requirement which the Trading Center might impose in an embodiment is related to the Limit Price of a SNAP Order. The Trading Center might elect to reject a SNAP Order which has a Limit Price which makes any execution doubtful. For example, if the best visible bid and offer prices for the Auction Instrument are 20.10 and 20.14, then a SNAP Order to buy with a Limit Price of 20.09 is unlikely to result in an execution. Commencing a SNAP Auction will result in that Auction Instrument being unavailable to trading in the Open Trading State for the length of one SNAP Auction Cycle. Submitting a SNAP Order with a Limit Price that is unlikely to result in an execution could be an abusive practice which the Trading Center could prevent by imposing a requirement that a condition for accepting a SNAP Order is having a Limit Price with reasonable proximity to prevailing market prices.

Order Modifiers—Snap Auction Only Order Modifier

A SNAP Auction Only Order is a limit order with a SNAP Auction Only order modifier. This order modifier is specific to SNAP Auctions. SNAP Auction Only Orders can be accepted by the Matching System prior to the start of a SNAP Auction or during a SNAP Auction.

When a SNAP Auction Only Orders is received by the Matching, it is placed in a dormant state upon acceptance. During the course of a subsequent SNAP Auction, SNAP Auction Only Orders which are being held in a dormant state are activated by the Matching System so that they can participate in the SNAP Auction.

SNAP Auction Only Orders can have a fixed Limit Price, or their Limit Price can be algorithmically-calculated by the Matching System at the time of activation. SNAP Auction Only Orders with an algorithmically-calculated Limit Price must elect to use a pricing algorithm which is supported by the Trading Center. In an embodiment, a Trading Center must determine what, if any, pricing algorithms the Trading Center will offer for use by SNAP Auction Only Orders.

One example of an algorithmically-calculated Limit Price is a pegged order. Pegged orders can be calculated using a base price such as the NBB, the NBO, or the NBBO Midpoint. Pegged orders can also incorporate a differential from the base price. For example, a SNAP Auction Only Order to buy may have an algorithmically-calculated Limit Price which is $0.03 below the NBB, $0.02 below the NBBO Midpoint, or $0.10 below the NBO. For example, a SNAP Auction Only Order to sell may have an algorithmically-calculated Limit Price which is $0.02 above than the NBB, $0.05 above than the NBBO Midpoint, or $0.01 equal to the NBO.

A second example of an algorithmically-calculated Limit Price is basing the calculation on the price of another security of the same asset class. For example, the Limit Price for a SNAP Auction Only Order in one stock may be based on the NBB, NBO, or NBBO Midpoint of another stock. An example would be using the NBB for Ford Motor Company common stock (symbol: F) as the price basis for algorithmically-calculating the Limit Price of a SNAP Auction Only Order to buy shares of General Motors common stock (symbol: GM). Recently shares of F were trading at approximately $14.30 and shares of GM were trading at approximately $31.00. An order sender might submit a SNAP Auction Only Order to purchase up to 50,000 shares of F at a calculated price equal to $$0.4613*NBB_{GM}-\$0.05$$

Using this algorithm, if the NBB of GM equals $30.55 at the time the SNAP Auction Only Order to buy 50,000 shares of F is activated, the Limit Price at which the SNAP Auction Only Order would be activated would be $$0.4613*\$30.55-0.05 \rightarrow \$14.092715-\$0.05$$
$$\rightarrow \$14.14 \text{ (rounded down to the next \$0.01)}$$

A third example of an algorithmically-calculated Limit Price is basing the calculation on the price of another security of a different asset class. For example, the Limit Price for a SNAP Auction Only Order in a common stock may be based on the NBB, NBO, or NBBO Midpoint of a listed option on the same common stock. An example would be using the NBB for a call option to purchase shares IBM Corporation common stock (symbol: IBM) as the price basis for algorithmically-calculating the Limit Price of a SNAP Auction Only Order to buy common shares of IBM. Recently shares of IBM were trading at approximately $153.00 and options to buy 100 shares of IBM common stock with a January 2015 expiration date and striking price of $150.00 were trading at approximately $6.00. An order sender might submit a SNAP Auction Only Order to purchase up to 10,000 shares of IBM at a calculated price equal to $$\$150.00+(NBB_{IBM\ JAN\ 150\ CALL}-\$4.20/0.60-\$0.10$$

Using this algorithm, if the NBB of the IBM Jan 150 Call equals $5.40 at the time the SNAP Auction Only Order to buy 10,000 shares of IBM is activated, the Limit Price at which the SNAP Auction Only Order would be activated would be $$\$150.00+(\$5.40-\$4.20/0.60-\$0.10 \rightarrow \$150.00+$$
$$\$1.20/0.60-\$0.10 \rightarrow \$150.00+\$2.00-\$0.10$$
$$\rightarrow \$151.90 \text{ (no rounding required)}$$

The system and method permit the Trading Center to offer any pricing algorithm it selects for use by order senders to calculate the Limit Price of a SNAP Auction Only Order at the time the Matching System activates that order for a given SNAP Auction.

Order Modifiers—Snap Auction Only Order Modifier—Determining Whether Active or Dormant at the Time of Initial Receipt When a SNAP Auction Only Order is initially received by the Matching Engine, it is always placed in a dormant state. All dormant SNAP Auction Only Orders for an Auction Instrument are activated at a specific point in the SNAP Auction Cycle (see below).

Order Modifiers—Snap Auction Only Order Modifier—Time in Force

There are three choices for the time in force of a SNAP Auction Only Order. The unexecuted portion of a SNAP Auction Only Order can expire either (1 at the end of the first SNAP Auction in which it participates, (2 at the end of the current trading session (if the Trading Center operates more than one trading session within a trading day), or (3 at the end of the trading day. The portion of a SNAP Auction Only Order which treated a Set-aside Order (see below) is not considered to be unexecuted until it is no longer being held as a Set-aside Order pending receipt of a response from another Trading Center to a Satisfaction Order.

At the end of each SNAP Auction, the unexecuted portion of an active SNAP Auction Only Order which participated in the SNAP Auction is evaluated to determine whether its time in force has expired. If the time in force of the SNAP Auction Only Order requires that the order be cancelled after the first SNAP Auction in which it participates, then the SNAP Auction Only Order is automatically cancelled at that time. Note that if a portion of a SNAP Auction Only Order is a Set-aside Order, the set-aside portion is not cancelled until it is certain that there are no additional Satisfaction Orders outstanding which may need to be matched against the Set-aside Order associated with the SNAP Auction Only Order. If the time in force of the SNAP Auction Only Order does not require that the order be cancelled after the first SNAP Auction in which it participates, the SNAP Auction Only Order is made inactive and will wait for the next SNAP Auction for the Auction Instrument or until its time in force expires.

At the end of each trading session, any inactive SNAP Auction Only Order which has a time in force which expires at the end of that trading session is automatically cancelled.

At the end of each trading day, all SNAP Auction Only Orders are automatically cancelled.

Order Modifiers—Snap Auction Only Order—Pricing Information

A SNAP Auction Only Order must also include pricing information. There are three choices for pricing a SNAP Auction Only Order.

First, a SNAP Auction Only Order can have a fixed Limit Price. If this choice is selected, the Working Price of the SNAP Auction Only Order is always the order's Limit Price during any SNAP Auction in which it participates.

Second, a SNAP Auction Only Order can be a Pegged Order, pegged to one or more prevailing market prices (e.g., NBB, NBO, or NBBO midpoint) and have no Limit Price. Pegged Orders are part of the current art of matching engines and, therefore, will not be discussed in detail in this document. The SNAP Auction Only Order's Working Price is calculated each time the order is made active during the SNAP Auction Pricing Process.

Third, a SNAP Auction Only Order can be a Pegged Order and also have an overriding Limit Price. The SNAP Auction Only Order's Working Price—constrained by the order's Limit Price—is calculated each time the order is made active during the SNAP Auction Pricing Process.

Order Modifiers—Cancel on Snap Auction Order Modifier

The CANCEL ON SNAP AUCTION order modifier can be applied to an order to buy or sell which is sent to the Matching Engine which is not: a SNAP order, a SNAP Auction Only Order, or an order intended to participate in another type of auction (e.g., an opening auction, a re-opening auction, or a closing auction). Generally speaking, the CANCEL ON SNAP AUCTION order modifier is intended to be used by orders which may be placed in the Trading Center's Order Book as a Resting Order when the Matching Engine is in the Open Trading State.

Depending on the embodiment by a Trading Center, the time elapsed during a SNAP Auction can be significant as compared with typical Matching Engine response times. During the transition to the SNAP Auction State, cancel and cancel/replace messages are placed in a FIFO queue to be processed during the transition back to the Open Trading State at the end of the SNAP Auction Cycle. Thus orders resting in the Trading Center's Matching Engine at the start of the SNAP Auction may not be cancelled until the end of the SNAP Auction. Parties sending orders to the Matching Engine may not be willing to have their Resting Orders held captive in the Order Book during the course of a SNAP Auction. The CANCEL ON SNAP AUCTION order modifier provides a way to address such concerns.

At the start of the SNAP Auction Cycle during the transition to the SNAP Auction State, all orders to buy or sell the Auction Instrument which are in the Order Book and have the CANCEL ON SNAP AUCTION order modifier are automatically cancelled. This prevents any such order from participating in a SNAP Auction and, at the same time, resolves the inability of the order sending to cancel the order by doing so automatically.

In another embodiment, the auction does not have to be triggered by the auction trigger of a SNAP order being received (order-driven SNAP Auction), but rather the auction trigger can be initiated by the system itself (system-generated SNAP Auction (also called "Organic SNAP Auction")).

For the order-driven SNAP Auction, the respective traders must be willing to pay the offer or sell on the bid, i.e., be willing to cross the (NBBO) spread between the two. The following example illustrates this. In the above, there may be a midpoint pegged by the order—e.g., the bid is $0.10 and the offer is $0.20, so the midpoint is $0.15. An auction only order is willing to pay the midpoint, and another order is willing to sell at the midpoint, and they are each 100,000 share orders.

The requirement is different for the system-initiated SNAP Auction (i.e., where no one has requested an auction). In this situation, when there is adequate size, according to a predefined threshold, in the number of orders for a particular financial instrument, there is no reason not to execute orders, even without a SNAP order being received (and without a requirement that the orders must cross the NBBO spread). The predefined threshold can vary across financial instruments, and can be determined by any relevant factor(s).

Thus, in this embodiment, periodically, for every symbol that is traded, the system asks, "if an auction ran right now, would there be enough size so that if somebody came in with a SNAP order, the system would give them an auction". If that's the case, then an auction can automatically be initiated (and not necessarily at the midpoint, but rather from an algorithmic formula according to various predefined criteria). Additionally, the auction does not necessarily have to be initiated the minute the potential match arises, because that gives out information telling the last order placer what orders were there previously (this approach permits being very dark about what information is given give out).

By way of example, if there are two-hundred names (symbols) in a processor, once per second, the system will assess whether an auction can be performed for that symbol until the entire two-hundred symbols are cycled through. Thus, every two-hundred seconds, the list is cycled through. For example, if, on the 43rd cycle, at 2:00 p, the system finds that there are 200,000 shares which would be matched if the system initiated a SNAP Auction, an auction in that symbol is started. By using the cycling, the auction could potentially have been viable up to two-hundred seconds before. Since nobody knows how many symbols are in the same box (they do not even know what the universe is), information about existing orders is minimized. This second embodiment relates to the trigger for the auction itself—the actual auction is the same.

The present system, by improving the speed of a specialized financial execution processor of the trading engine itself by switching between an open trading state and an auction state, and pooling orders in advance of an auction resulting in fast and efficient trading of the financial instruments, can be applied to improve other technology areas in which speed improvements can be achieved using specialized processors by pooling certain categories of processed elements in advance of a triggered execution.

In a general embodiment, a method is disclosed herein, comprising: providing a matching engine processor, comprising: a processor; a non-volatile data store comprising data and software modules; and an electronic communication interface comprising an input and output; trading, with the processor, a financial instrument in an open trading system (OTS) state in which orders in a financial instrument electronically submitted over the communication interface that are stored in the non-volatile data store are matched in real time, with the processor of the matching engine processor; in response to an auction trigger: transitioning the processor to trading the financial instrument in the auction state in which orders in the financial instrument are not matched in real time and aggregated orders are executed by the processor at a single common price, except for satisfaction orders, that is set based on predetermined criteria; and when the auction state is complete, transitioning the processor to trading the financial instrument back into the OTS state.

In an embodiment, a method, is provided comprising: providing a matching engine processor, comprising: a processor; a non-volatile data store comprising data and software modules; and an electronic communication interface comprising an input and output; during an open trading system (OTS) state in which orders in a financial instrument are matched in real time, with the matching engine processor: determining an auction trigger; determining, by the matching engine processor if predefined SNAP order criteria are met, and, if so, then, performing an OTS to SNAP auction state (SAS) transition of the processor (OTS→SAS) for the financial instrument; during the OTS to SAS transition (OTS→SAS), with the matching engine processor: until returning to the OTS: canceling published quotes for the financial instrument; externally indicating an empty electronic order book for the financial instrument; and accumulating, without matching, new orders for the financial instrument into the electronic order book; and when the OTS to SNAP transition state is complete, then beginning a SNAP auction period AP; during the AP, with the matching engine processor: queuing, without executing, cancel or cancel/replace (CXL—CXL/REP) order messages into a SNAP queue until transitioning back to the OTS; receiving new inbound orders for the financial instrument and placing them into the electronic order book; and terminating the AP according to a predefined criteria and then beginning a SNAP auction pricing process APP; during the APP, with the matching engine processor: queuing, without executing, inbound orders and CXL—CXL/REP orders into the SNAP queue; determining a single SNAP auction price APr based on all orders to be included in the SNAP auction according to an order inclusion predefined criteria, the price Apr also being determined according to an auction price predefined criteria; and after the APr has been determined, beginning a SNAP auction satisfaction period ASP; during the ASP, with the matching engine processor: sending orders to other trading centers as needed to complete the SNAP auction at the auction price APr; and terminating the ASP according to a predefined criteria, and then beginning a SNAP auction order matching process AOMP; during the AOMP, with the matching engine processor: matching other resting orders which are not set-aside for open satisfaction orders at the auction price APr; and terminating the AOMP and then performing a SAS to OTS transition for the financial instrument; during the SAS to OTS transition, with the matching engine processor: removing all remaining SNAP auction only orders from the electronic order book and placing them into the Auction Only Orders Queue or canceling as instructed; performing a SNAP auction state (SAS) to OTS state (OTS) transition of the processor (SAS→OTS) for the financial instrument; resuming real-time matching of orders in the financial instrument; and processing all messages in the SNAP queue until it is empty; and publishing data associated with the financial instrument.

DESCRIPTION OF THE DRAWINGS

For a more complete understanding of the system and method described herein, and for further features and advantages, reference is now made to the following descriptions, taken in conjunction with the accompanying drawings, in which:

FIG. 1B is a block flow diagram that illustrates a typical configuration for how Matching Engines may be connected to other systems within a Trading Center;

FIG. 2B is a table showing certain types of messages received by the Trading Center;

FIGS. 4A-B are parts of a flowchart that collectively illustrate a typical transition from an Open Trading State to a SNAP Auction State;

DETAILED DESCRIPTION

Figure 1A:
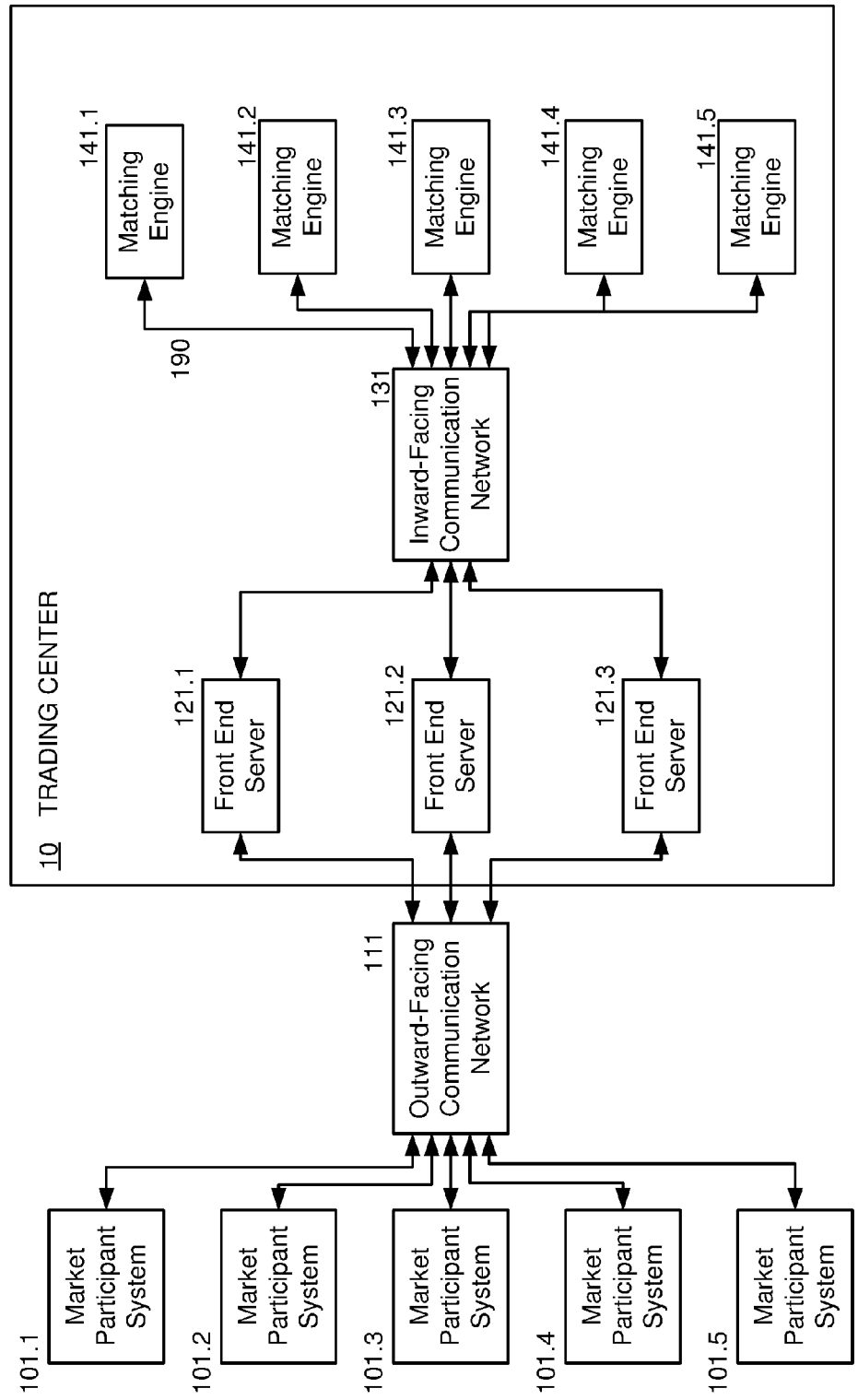
FIG. 1A is a block flow diagram that illustrates a typical configuration showing a flow of messages between a Trading Center and Market Participants.

FIG. 1A is a block flow diagram that illustrates a typical configuration showing how a Market Participant's systems outside of the Trading Center connect to computers within the Market Participant's Trading Center which are programmed to operate as Matching Engine(s) by a Trading Center. The Trading Center's Matching Engines attempt to match orders to buy with orders to sell. A Matching Engine may also execute a cross transaction in which the order sender identifies both the buyer and the seller of a proposed transaction, although cross transactions are not expanded upon herein. This figure is provided solely for the purpose of illustrating how this connectivity might be provided. The description herein does not discuss the details of how this connectivity is provided. The system and method described herein operate within an enhanced Matching Engine which is programmed to support the system and method.

Systems operated by Market Participants 101.1, 101.2, 101.3, 101.4, and 101.5 (collectively or representatively 101) are external to the Trading Center's network. These devices electronically transmit messages to the Trading Center using an Outward-Facing Communication Network operated by the Trading Center 111. Typically messages sent from Market Participants to the Trading Center include order, cancel, and cancel/replace messages.

When a message is received by the Trading Center's Outward-Facing Communication Network 111, it is typically directed to one of a number of Front End Servers 121.1, 121.2, or 121.3 (collectively or representatively 121). Trading Centers may perform various types of message validation and internal routing functions within their Front End Servers. Typically, the Trading Center's Front End Servers determine the Matching Engine 141.1, 141.2, 141.3, 141.4, or 141.5 (collectively or representatively 141) to which to route a messages from a Market Participant 101 to the Matching Engine 141 using the Trading Center's Inward-Facing Communication Network 131 via the Matching Engine Input 191. The detailed nature of unrelated activities within the Trading Center's Front End Servers is not further described herein.

When a Matching Engine has a message to send to a Market Participant (e.g., an execution report, a cancel confirmation, etc.), the Matching Engine 141 sends the message through the Inward-Facing Communication Network 131 to one of the Trading Center's Front End Servers 121. Trading Center's Front End Server 121 then transmits the message to the appropriate Market Participant System 101 using Trading Center's Outward-Facing Communication Network 111.

FIG. 1B is a block flow diagram that illustrates a typical configuration showing how such an enhanced Matching Engines would typically be connected to other systems within a Trading Center. The configuration is somewhat dependent upon the market structure(s) within which the Trading Center operates. A given Trading Center may not require some components other than one or more Matching Engines based on market structure.

FIG. 1B provides illustrates a typical configuration of systems connected to one of a Trading Center's Matching Engines. This figure is provided to illustrate how this connectivity may be provided. Details of how this connectivity is provided are not further described herein.

The connection between the Trading Center's Inward-Facing Communication Network 131 and a given Matching Engine 141 was described as part of FIG. 1A above.

Depending on the rules and regulations related to trading a given Financial Instrument, it may be necessary for the Trading Center's Matching System 141 to receive inbound market data from a quotation and/or last sale data consolidator 151 which aggregates market data from multiple Trading Centers 111. In certain cases, a Trading Center's Matching System 141 may use inbound market data from one or more private data feeds 152 offered by other Trading Centers to replace or augment market data from a consolidator 151.

For example, assume that a US national securities exchange trading equities securities under Reg NMS is trading a fungible asset which may also be traded on several other US equities exchanges and over-the-counter. If an equities security traded by a US national securities exchange is subject to Reg NMS, Trading Centers must have market data to identify protected quotations from every other national securities exchange trading that security as well as market data from the FINRA ADF. All of the required data for any such Financial Instrument can be obtained from a securities information processor (SIP) which provides this data over three distinct data feeds or "tapes", wherein Tape A provides data for securities which have a primary listing on the New York Stock Exchange, Tape C provides data for securities which have a primary listing on the NASDAQ Stock Market, and Tape B provides data for all other securities which are listed on a US national securities exchange.

SIPs act as consolidators of inbound market data from all sources 151 (e.g., national securities exchanges and the FINRA ADF). The US Securities and Exchange Commission currently permits Trading Centers to use private data feeds 152 as a substitute for some or all of the data provided by the SIPs 151.

However, US futures markets typically trade contracts which are not fungible with a contract which is traded on another futures market. There is no need to consolidate market data from multiple sources for a futures contract which trades in only one market. Furthermore, there are no rules analogous to Reg NMS which require a Trading Center to receive either a consolidated or private data feed to operate.

Thus 151 and/or 152 are not always required to support a Trading Center's Matching Engines.

All Trading Centers require some ability to manually control and manage each Matching Engine. The access required to perform these functions is represented by 153.

A Trading Center must be able to record all significant activities and events. These activities and events could include arrival of new orders, execution of orders, cancellation of orders, transmission of market data, reporting trades to clearing, etc. These logs are recorded to and maintained on 154 which may be a data file, a database, or some other means to log such data.

If an inbound market data consolidator exists 151, then the Trading Center may need to provide outbound market data to that consolidator to be included in the consolidator's data feed. The system which creates and disseminates data to be sent to a consolidator is shown as 155.

If the Trading Center publishes its own, private market data feed, then 156 would be the system which creates and disseminates that private market data feed.

Trading Centers typically submit information regarding matched trades to a clearing organization on behalf of buyers and sellers. For Trading Centers which provide this data, the system which creates and disseminates clearing data is shown as 157.

In certain regulatory frameworks, it is important for a Trading Center to be able to route one or more orders to other Trading Centers. A Trading Center offering trading in Reg NMS securities is an example where order routing is important. The system which handles outbound order routing is shown as 158.

Figure 1C:
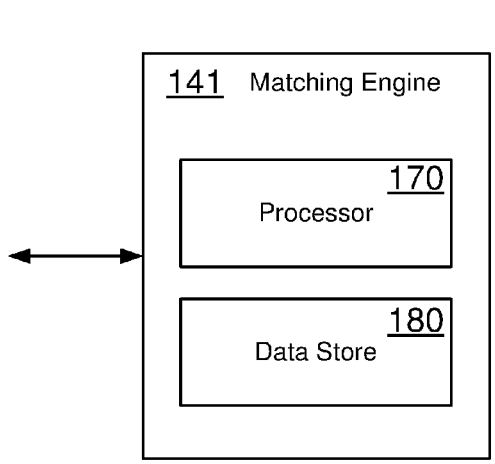
FIG. 1C is a block diagram showing hardware components of a Matching Engine.

FIG. 1C is a block diagram illustrating the basic components of the Matching Engine 141, which include a processor 170 (which may comprise one or more physical processors), a data store 180 that is used to hold data associated with the Matching Engine 141. A communications interface 190 is provided for data input and output to the matching engine 141.

Figure 1D:
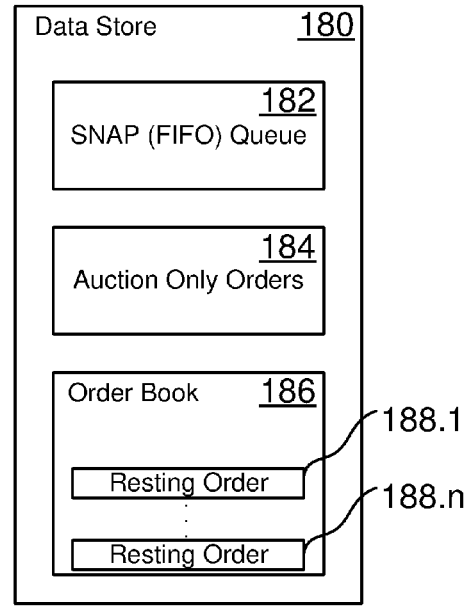
FIG. 1D is a block diagram showing a non-volatile data store and its contents.

FIG. 1D is a block diagram providing a breakdown of the data store 180. It contains a list of different places orders in the data store can exist, including: a SNAP Queue 182, which may be a first-in-first-out (FIFO) queue for new order messages that arrive too late to participate in the SNAP Auction, a store for dormant Auction Only Orders Queue 184, and an Order Book 186 that comprises orders eligible for handling by the Matching Engine 141 and is the collection of all currently active orders held in a Matching Engine which are currently eligible to be matched (Resting Orders 188.1 through 188.*n*) (collectively Resting Orders 188). Dormant orders are not in the Order Book 186, since the Order Book 106 only contains orders eligible for matching.

Figure 2A:
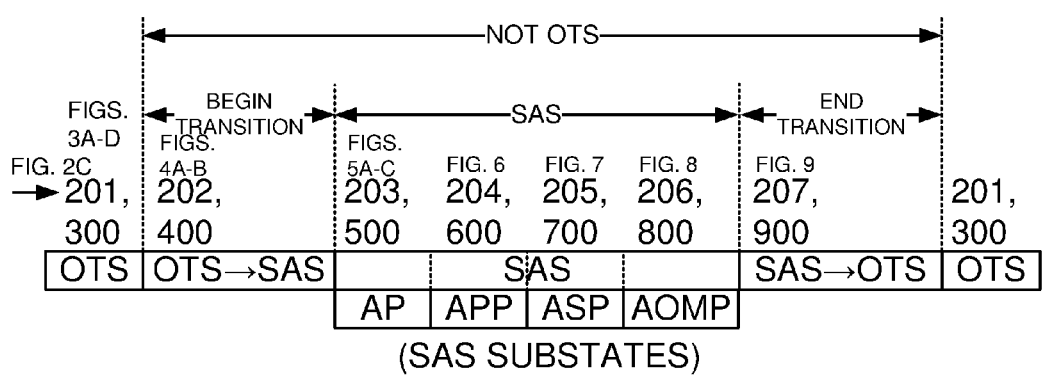
FIG. 2A is a block diagram illustrating the various states of operation.
Figure 2C:
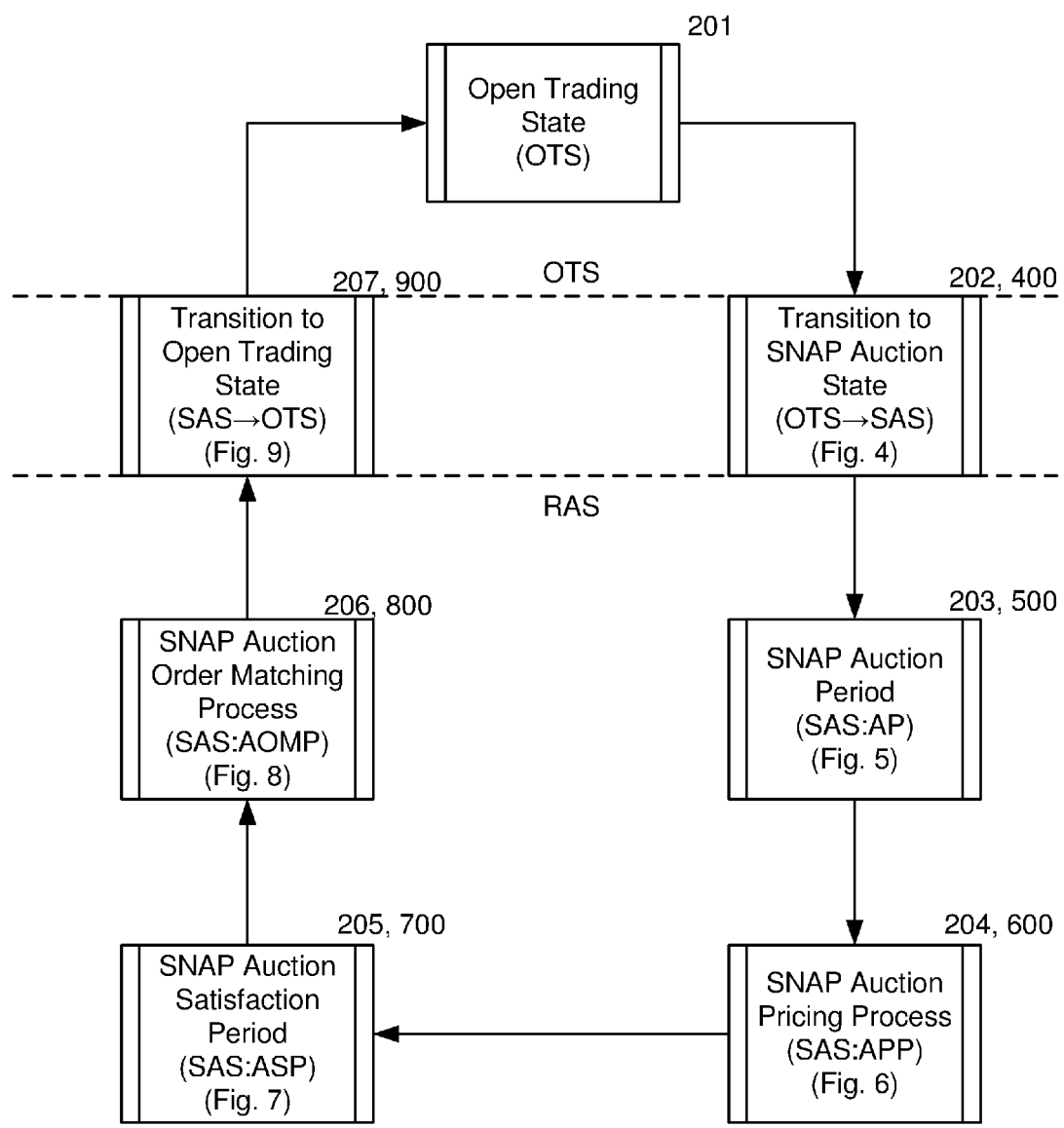
FIG. 2C is a state diagram that illustrates the major steps in the on-demand SNAP Auction process.

FIG. 2A is a diagram illustrating the cycle of going from an open trading state (OTS) to a SNAP Auction State (SAS) and back. FIG. 2D is a related high-level flow diagram that illustrates the transitions. These states are the open trading system OTS 201, 300 state, the transition from OTS to SNAP 202, 400, the SNAP Auction State SAS 203-206, 500-800, and the transition from SNAP to OTS 207, 900. Depending on the context, the start of the SNAP auction can be at the start of element 202, the end of element 202, or any time in between. Similarly, depending on the context, the end of the SNAP Auction can be considered as either the start of element 207, the end of element 207, or any time in between. Within the SNAP Auction State SAS, there is an Auction Period (AP) 203, 500, an Auction Pricing Process (APP) 204, 600, an Auction Satisfaction Period (ASP) 205, 700, and an Auction Order Matching Process (AOMP) 206, 800. Each of these states is addressed in more detail below.

FIG. 2B is a chart showing different messages FIG. 2B related to different orders. The messages shown in FIG. 2B are simply orders (which may include the previously discussed modifiers) and cancels or cancel/replaces communicated to the Matching Engine 141. The messages can be broken down into affirmative order messages M10, M20, M30, M40 and cancel or cancel/replace orders (CXL or CXL/REP) M15, M25, M35, M45. The order modifiers can be distinguished by, e.g., an order modifier identifier, a modifier flag within an order record, or any other type of mechanism for providing and delineating order modifiers.

FIG. 2D is a state diagram that illustrates the major steps in the on-demand SNAP Auction process as described in the section entitled SNAP AUCTION CYCLE above, and as shown in FIG. 2A. The SNAP Auction Cycle begins and ends with the Financial Instrument in an Open Trading State OTS 201, 300. After receiving a SNAP Order which meets are applicable requirements, the subsequent steps include Transition to the SNAP Auction State OTS→SAS 202, 400, the SNAP Auction Period SAS:AP 203, 500, the SNAP Auction Pricing Process SAS:APP 204, 600, the SNAP Auction Satisfaction Period SAS:ASP 205, 700, the SNAP Auction Order Matching Process SAS:AOMP 206, 800, and the Transition to the Open Trading State SAS→OTS 207, 900.

Prior to the initiation of a SNAP Auction, the Matching Engine for the Auction Instrument must be in an Open Trading State 201. An overview of how a Matching Engine handles orders associated with a SNAP Auction while in an Open Trading State is illustrated in FIGS. 3A-D.

When the Matching Engine receives a SNAP Order which meets the Trading Center's requirements to begin a SNAP Auction, the Matching Engine begins the process of transitioning from an Open Trading State to a SNAP Auction State in 202. All published quotes are withdrawn. All private data feeds showing the contents of the Trading Center's Order Book are sent to reflect an empty Order Book. The Matching Engine no longer attempts to match new orders in the Auction Instrument upon receipt. Instead new orders in the Auction Instrument will accumulate—possibly creating a Locked Order Book or a Crossed Order Book. Additional steps may be taken to reflect that the Trading Center is no longer in an Open Trading State and that a SNAP Auction has begun (e.g., the Trading Center may publish a message announcing the start of a SNAP Auction in the Auction Instrument). This is illustrated in FIG. 4.

Figure 6:
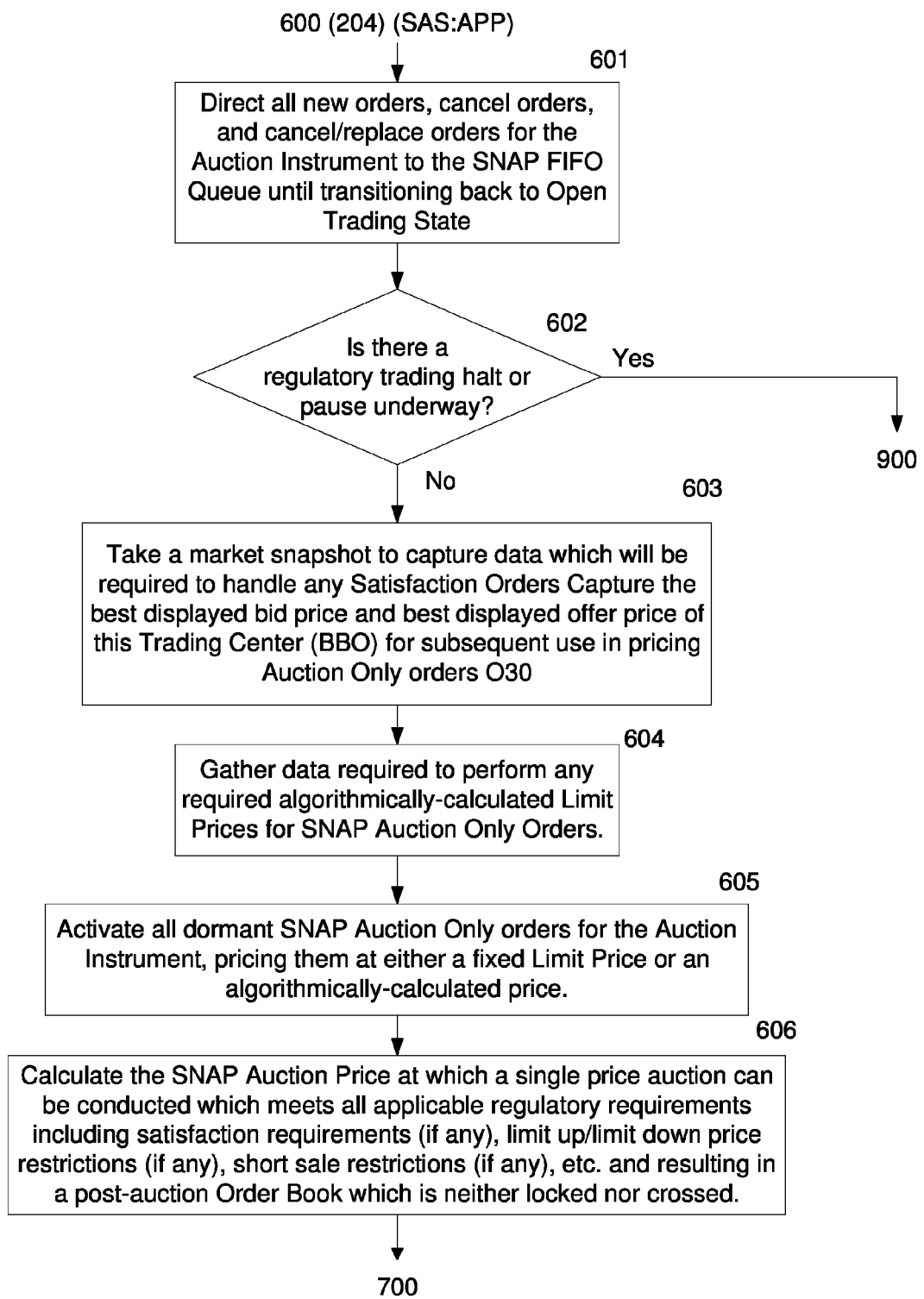
FIG. 6 is a flowchart that illustrates the steps taken by the Matching Engine during the SNAP Auction Pricing Process.

When the transition to a SNAP Auction State 202 is complete, the SNAP Auction Period 203 begins. The SNAP Auction Period lasts for a fixed period of time plus or minus an optional random time component. The optional random time component would make the precise end of the SNAP Auction Period unpredictable to avoid "gaming." During the SNAP Auction Period, the Trading Center continues to receive new inbound orders in the Auction Instrument. However, it does not process cancel or cancel/replace messages until the SNAP Auction ends. These messages are queued for subsequent processing. Details of the SNAP Auction Period are illustrated in FIG. 6.

When the SNAP Auction Period ends 203, the SNAP Auction Pricing Process 204 begins. At this point, new inbound orders in the Auction Instrument as well as cancel and cancel/replace messages in the Auction Instrument are queued for subsequent processing. SNAP Auction Only orders eligible to participate in the SNAP Auction are priced and included in the SNAP Auction along with all other orders in the Auction Instrument. At this point, all orders to be included in the SNAP Auction are present in the Matching Engine at this time. If the rules and regulations related to the trading of this Financial Instrument require that Satisfaction Orders be sent, then all protected quotations from other Trading Centers are included in the calculation of the SNAP Auction Price. At the end of the SNAP Auction Pricing Process, the SNAP Auction Price is determined. Details of the SNAP Auction Pricing Process are illustrated in FIG. 6.

Figure 7:
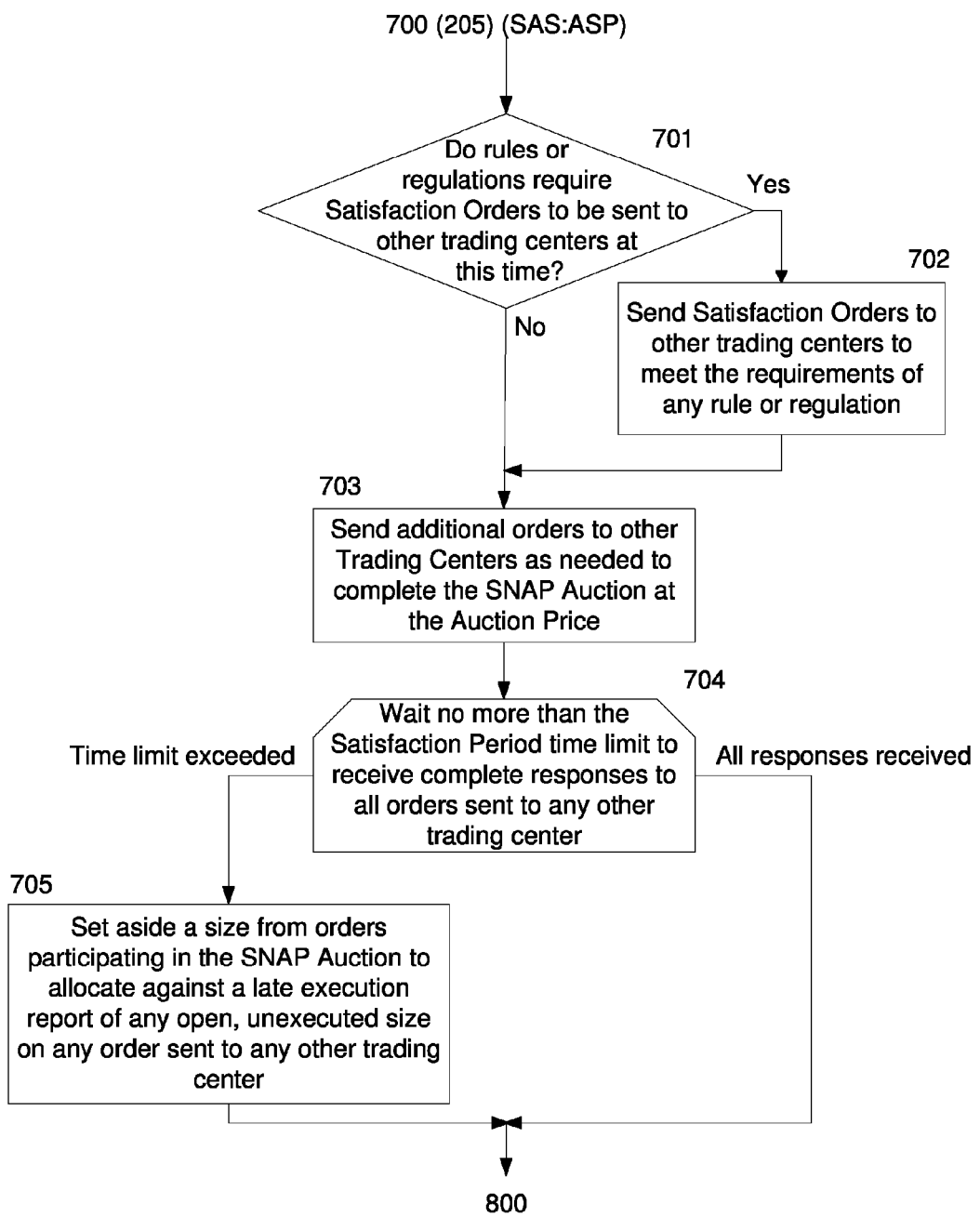
FIG. 7 is a flowchart that illustrates the steps taken by the Matching Engine during the SNAP Auction Satisfaction Period.

Now the SNAP Auction Satisfaction Period 205 begins. The rules and regulations related to the trading of this Financial Instrument may require that Satisfaction Orders be sent. If it is unnecessary to send Satisfaction Orders, then the SNAP Auction Satisfaction Period ends immediately. If it is necessary to send Satisfaction Orders, then the Satisfaction Orders are sent, and the SNAP Auction Satisfaction Period begins for a fixed period of time. The SNAP Auction Satisfaction Period continues until either a complete response to all Satisfaction Orders has been received (leaving no unexecuted balance of any Satisfaction Order outstanding) or when the time period has lapsed—whichever comes first. Details of the SNAP Auction Satisfaction Period are illustrated in FIG. 7.

Figure 8:
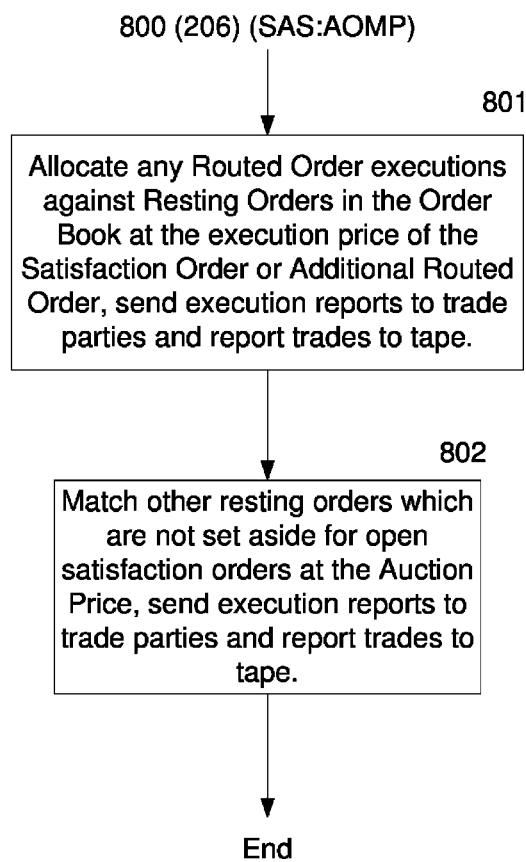
FIG. 8 is a flowchart that illustrates the steps taken by the Matching Engine during the SNAP Auction Order Matching Process.

When the SNAP Auction Satisfaction Period 205 ends, the SNAP Auction Order Matching Process 206 begins. Any executions which arose in response to a Satisfaction Order are allocated to the appropriate order(s) in the Order Book. Satisfaction Order executions are allocated at the Satisfaction Order's execution price. If one or more Satisfaction Orders has an outstanding unexecuted balance, sufficient size will be set-aside from the Order Book to allocate to any subsequently-reported Satisfaction Order executions. These are called Set-aside Orders, and may be pending even after a return to the Open Trading State 207. Thereafter, all remaining, non-set-aside orders which can be matched are matched at the SNAP Auction. Details of the SNAP Auction Order Matching Process are illustrated in FIG. 8.

When the SNAP Auction Matching Process 206 is complete, the Matching Engine must transition from the SNAP Auction State to the Open Trading State 207. All unexecuted SNAP Auction Only Orders are now either cancelled or returned to an inactive state. At this point, the Trading Center's Order Book is neither locked nor crossed. The Matching Engine is now enabled to permit matching new inbound orders immediately upon receipt. The queue of new orders, cancellations of existing orders, and cancel/replacement of existing orders is now processed against the Order Book. After the queue is exhausted, subsequent new order, cancel, and cancel/replace messages are processed in sequence as received by the Matching Engine. The other steps taken when transitioning from an Open Trading State to a SNAP Auction State 202 are now reversed. The Trading Center's current quotation is published. If the Trading Center publishes the contents of its Order Book to a private market data feed, that information is now published. The transition to an Open Trading State is now complete. The transition from the SNAP Auction State to the Open Trading State is illustrated in FIG. 9.

Figure 3A:
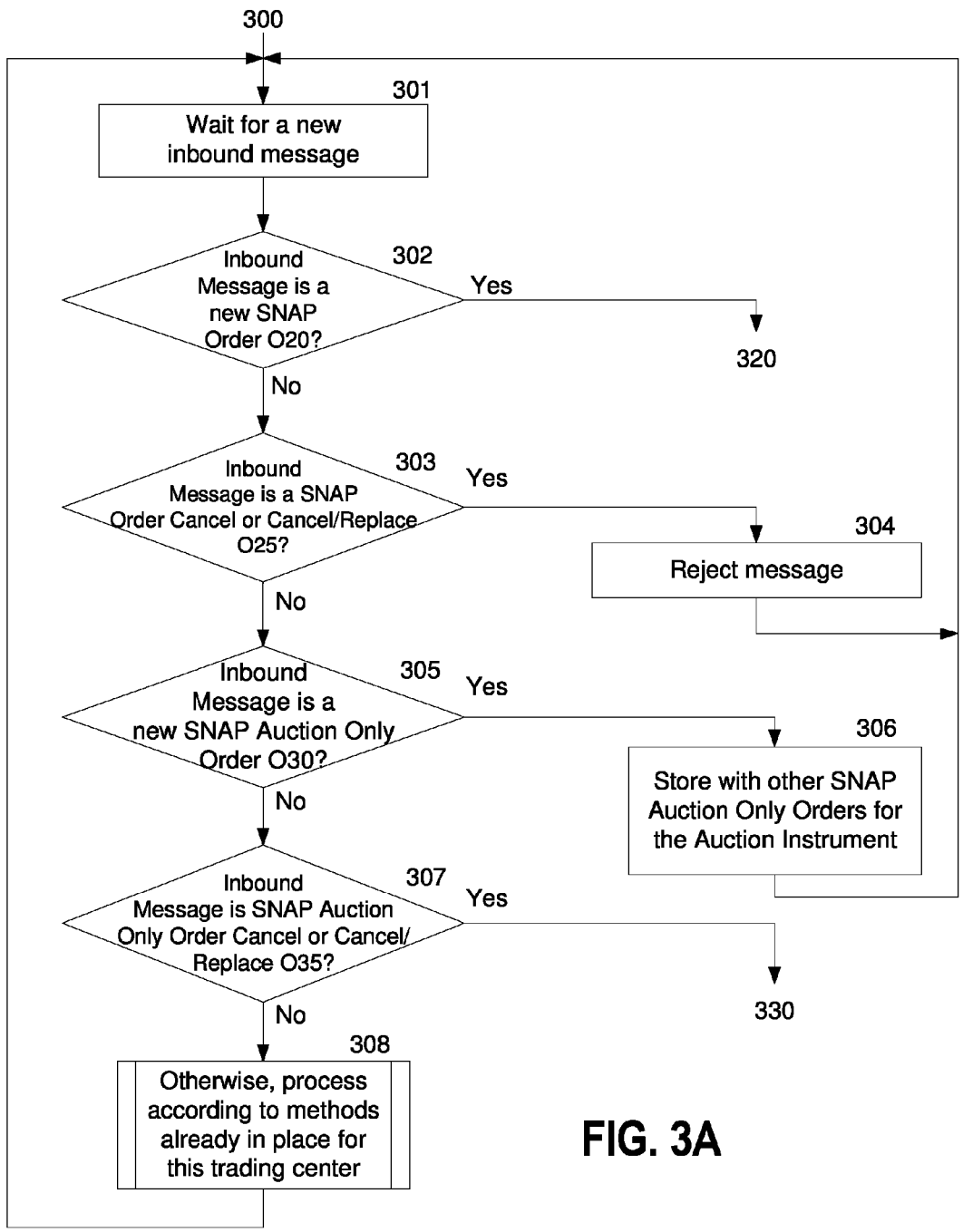
FIGS. 3A-D constitute portions of a flow chart that collectively illustrate how the Matching Engine processes incoming orders related to SNAP Auctions.
Figure 3B:
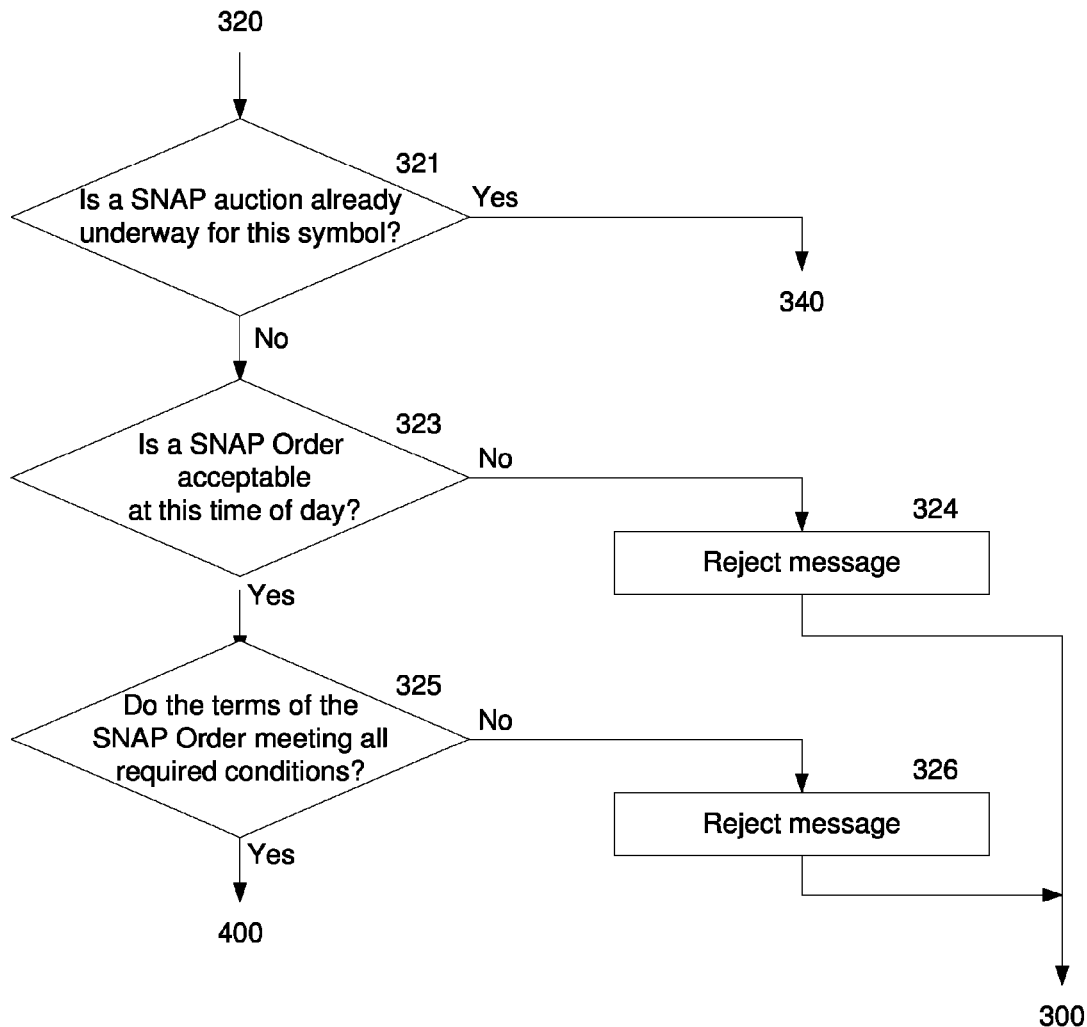
Figure 3C:
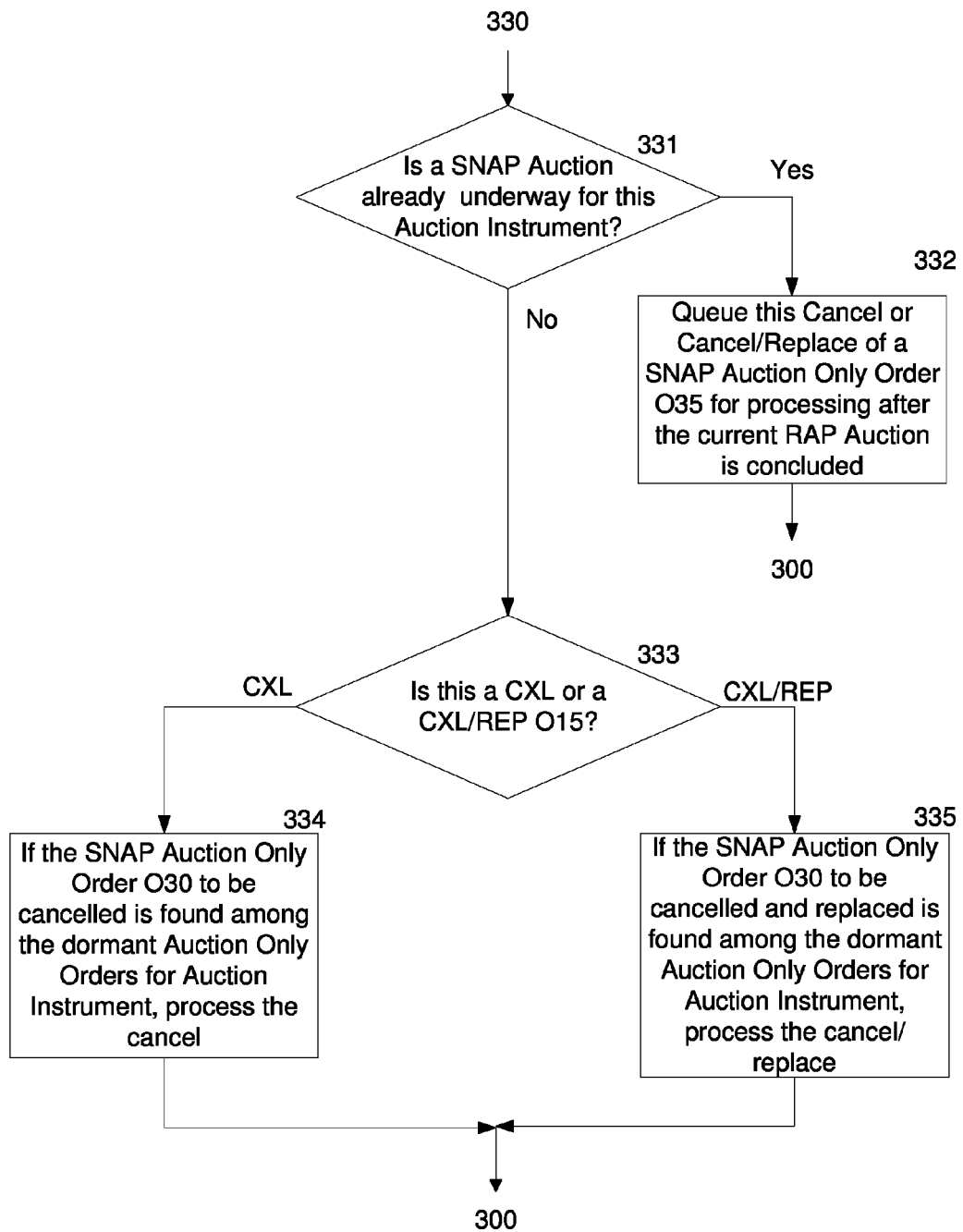
Figure 3D:
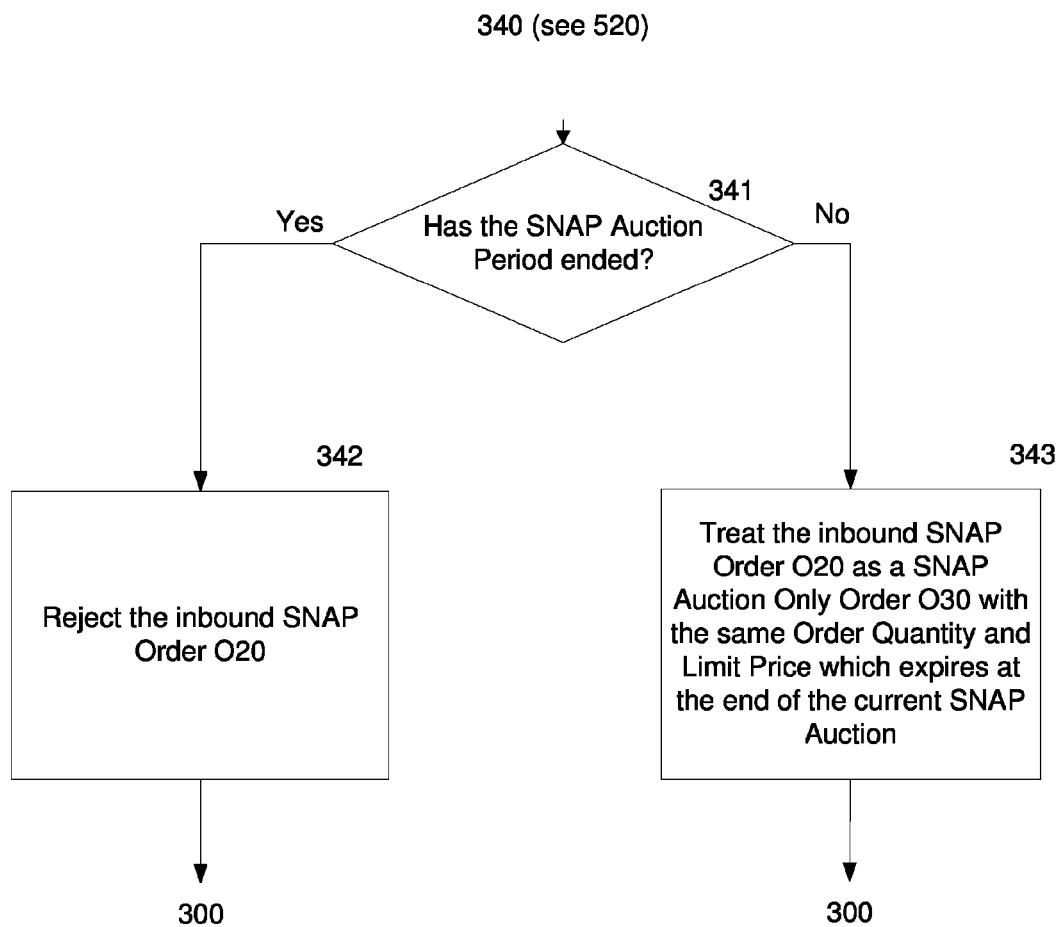

FIG. 3A, FIG. 3B and FIG. 3C constitute portions of a flow chart that collectively illustrate how the Matching Engine processes incoming orders related to SNAP Auctions. This is a subset of other Matching Engine activities. There are three sets of incoming orders which are related to SNAP Auctions: SNAP Orders (SNAP Orders cannot be cancelled), SNAP Auction Only Orders (this includes new SNAP Auction Only Orders, orders to cancel an existing SNAP Auction Only Order, and orders to cancel/replace an existing SNAP Auction Only Order), other orders which include a CANCEL ON SNAP AUCTION modifier (this includes new orders with a CANCEL ON SNAP AUCTION modifier, orders to cancel such orders, and orders to cancel/replace such orders). Automated evaluation and possible cancellation of SNAP Auction Only Orders at the end of a trading session or the end of the trading day are not shown in any figure. Certain orders may be cancelled at the end of trading sessions or the end of the day. FIG. 3D is a flowchart illustrating a Matching Engine receipt of an inbound message FIG. 3A illustrates the initial steps the Matching Engine takes when it receives either a SNAP Order or a SNAP Auction Only Order during the Open Trading State (OTS).

When a new order, cancel, cancel/replace, or any other message arrives at the Matching Engine, processing begins at 300 where the Matching Engine waits for the next inbound message.

At 301 the Matching Engine waits for a new inbound message. When one is received, processing continues at 302.

At 302 the Matching Engine determines whether the inbound message is a new SNAP Order. A new SNAP Order is an order which requests the start of a SNAP Auction in a given Financial Instrument—the Auction Instrument. SNAP Orders are described above under the heading SNAP ORDER. If the inbound message is a SNAP Order, processing continues at 320 on FIG. 3B. If the inbound order is not a new SNAP Order, processing continues at 303.

At 303 the Matching Engine determines whether the new message is an attempt to either cancel or cancel/replace a SNAP Order. If the new message is either, processing is continued at 304. Otherwise processing continues at 305.

At 304 the Matching Engine rejects the inbound message because here a SNAP Order is not permitted to be cancelled or replaced. Processing continues at 300.

At 305 the Matching Engine determines whether the new message is a new SNAP Auction Only Order. This order is described above under the heading SNAP AUCTION ONLY ORDERS. A SNAP Auction Only Order remains dormant within the Matching Engine and is only priced and made active at the start of the SNAP Auction Pricing Process 204 after the SNAP Auction Period 203 ends. If the new message is a new SNAP Auction Only Order, processing continues at 306. Otherwise processing continues at 307.

At 306 the new SNAP Auction Only Order is stored with other dormant SNAP Auction Only Orders for the Auction Instrument. It will remain in that state until a SNAP Auction enters the SNAP Auction Pricing Process 204 or until the SNAP Auction Only Order expires. Processing continues at 300.

At 307 the Matching Engine determines whether the new message is an attempt to cancel or cancel/replace a SNAP Auction Only Order. In this case, processing continues at 330 on FIG. 3C. Otherwise processing continues at 308.

At 308 the Matching Engine processes other new messages as it would have traditionally, with one exception. An order may have a new order modifier—CANCEL ON SNAP AUCTION. This order modifier is described above under the heading CANCEL ON SNAP AUCTION. This order modifier remains associated with the new message. After processing the new message, processing continues at 300.

FIG. 3B illustrates the handing of a new SNAP Order message by the Matching Engine.

At 320 the Matching Engine begins processing a new inbound SNAP Order for the Auction Instrument.

At 321 the Matching Engine determines whether the Trading Center currently has a SNAP Auction underway for the Auction Instrument. Multiple, simultaneous SNAP Auctions in the same Auction Instrument is not permitted. If such a SNAP Auction is already underway for the Auction Instrument, processing continues at 340. Otherwise processing continues at 323.

At 323 the Matching Engine determines whether the SNAP Order can be accepted at this time of day. The Trading Center may choose to have limitations as to when a SNAP Auction can be conducted. For example, the Trading Center may have more than one trading session and only permit SNAP Auctions during certain trading sessions. The Trading Center may choose to have a period of time immediately after the start of a trading session for the market to reach a pricing equilibrium during which SNAP Orders are not permitted. Similarly the Trading Center may choose not to accept SNAP Orders for a period immediately prior to the end of a trading session to avoid a SNAP Auction interfering with the normal close of a trading session. If the current time is an acceptable time for the Trading Center to begin a SNAP Auction, processing continues at 325. Otherwise processing continues at 324.

At 324 the Trading Center has determined that a SNAP Order is not acceptable at this time of day. The SNAP Order is rejected, and processing continues at 300.

At 325 the Trading Center determines whether the SNAP Order meets whatever conditions which the Trading Center may require to start a SNAP Auction. Examples of possible conditions are meeting a minimum order size to warrant conducting a SNAP Auction or meeting certain pricing requirements to warrant conducting a SNAP Auction (e.g., being marketable at prevailing prices). If the terms of the SNAP Order meet all conditions required by the Trading Center to start a SNAP Auction, processing continues at 400. Otherwise processing continues at 326.

At 326 the Trading Center has determined that the terms of the SNAP Order do not meet all of the requirements which the Trading Center has to start a SNAP Auction. The SNAP Order is rejected, and processing continues at 300.

FIG. 3C illustrates the handing of a new SNAP Auction Only Order message by the Matching Engine.

At 331 the Matching Engine determines whether there is a SNAP Auction underway for the Auction Instrument for which the cancel or cancel/replace is intended. If so, processing continues at 332. Otherwise processing continues at 333.

At 332 the Matching Engine is currently processing a SNAP Auction in the same Auction Instrument as the requested cancel or cancel/replace message. Cancellation of SNAP Auction Only Orders during a SNAP Auction for that Auction Instrument are not permitted here. Therefore the requested cancel or cancel/replace message must be placed in a queue to be processed after the current SNAP Auction is complete. Processing continues at 300.

At 333 a SNAP Auction is not currently underway for the Auction Instrument for which the cancel or cancel/replace message has been sent. The Matching Engine determines where the inbound message is a cancel or a cancel/replace. If the message is a cancel, processing continues at 334. If the message is a cancel/replace, processing continues at 335.

At 334 the inbound message is a cancel of a SNAP Auction Only Order. If the SNAP Auction Only Order to be cancelled can be found, the cancellation is processed. If the SNAP Auction Only Order to be cancelled cannot be found, no action is required other than responding to the order sender. Processing continues at 300.

At 335 the inbound message is a cancel/replace of a SNAP Auction Only Order. If the SNAP Auction Only Order to be cancelled and replaced can be found, the cancel/replace is processed. If the SNAP Auction Only Order to be cancelled and replaced cannot be found, no action is required other than responding to the order sender. Processing continues at 300.

FIG. 3D illustrates the handing of a new SNAP Order message by the Matching Engine when a SNAP Auction is already underway for the Auction Instrument.

At 340 the Matching Engine determines what to do with a SNAP Order which is received for an Auction Instrument when a SNAP Auction is already underway for the same Auction Instrument. Processing continues at 341.

At 341 the Matching Engine determines whether the SNAP Auction already underway for the Auction Instrument has proceeded beyond the end of the SNAP Auction Period. If it has, processing continues at 342. Otherwise processing continues at 343.

At 342 the Matching Engine must reject the inbound SNAP Order because multiple, concurrent SNAP Auctions for the same Auction Instrument are not supported here and it is too late to include the inbound SNAP Order in the SNAP Auction already underway. After the inbound SNAP Order is rejected, processing continues at 300.

At 343 the Matching Engine includes the inbound SNAP Order in the SNAP Auction already underway. To achieve this, the SNAP Order is treated as though it were an inbound SNAP Auction Only Order with the same Order Quantity and Execution Price—and scheduled the expire at the end of the current SNAP Auction. Processing continues at 300.

Figure 4B:
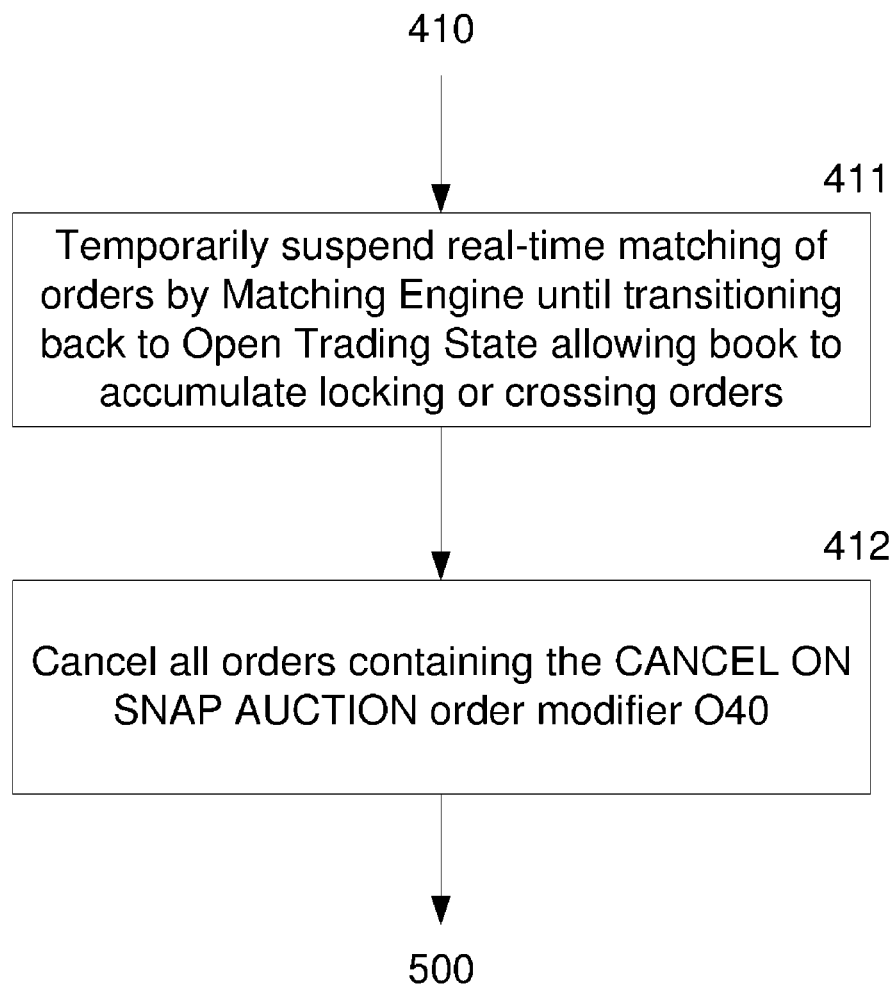

FIG. 4A and FIG. 4B are parts of a flowchart that collectively illustrate a typical transition from an Open Trading State (OTS) to a SNAP Auction State (SAS). The details of this transition must be appropriate for the market structure within which each Financial Instrument is traded.

FIG. 4A illustrates the steps the Matching Engine takes at the start of a SNAP Auction Cycle to transition from an Open Trading State to a SNAP Auction State. The required steps are, in part, a function of the market structure within which the particular Financial Instrument trades including applicable rules and regulations governing trading in that Financial Instrument.

When the Trading Center determines that a new SNAP Auction should commence, processing begins at 400.

At 401 the Matching Engine creates an empty SNAP FIFO Queue to store certain messages for the Auction Instrument entering a SNAP Auction. The purpose of this queue is to hold messages related to the Auction Instrument which cannot be processed immediately during the SNAP Auction. When a SNAP Auction begins, the Matching System will freeze the contents of its open Order Book. This will include delaying handling of cancel or cancel/replace messages related to orders for the Auction Instrument until after the SNAP Auction Matching Process is completed. After the SNAP Auction Period has ended, the Trading Center would want to queue all order, cancel, and cancel/replace messages until the transition from the SNAP Auction State to the Open Trading State was underway. The SNAP FIFO Queue is where these deferred messages would be placed. After the SNAP FIFO Queue is created for the Auction Instrument, processing continues at 403.

At 403 the Matching Engine publishes a new quote for the Auction Instrument. The new quote should show 0.00 as the bid and offer prices, 0 as the bid and offer sizes (if the Trading Center displays quote size), and an indication that a SNAP Auction is underway (if that can be done through the quote dissemination mechanism used by the Trading Center). This is done because all orders resulting in that quote are only accessible through the SNAP Auction until the Trading Center returns to the Open Trading State for the Auction Instrument. For example, under Reg NMS in the US, a published quote is a firm quote that should be immediately accessible for trading. However, during a SNAP Auction, that quote would not be accessible and, therefore, should be withdrawn from the marketplace. Processing continues at 404.

At 404 the Matching Engine determines whether there is a market data consolidator which handles consolidates and disseminates quote data for the Auction Instrument. If there is a market data consolidator, processing continues at 405. Otherwise processing continues at 406.

At 405 the Matching Engine temporarily suspends publishing new quote data for the Auction Instrument until transitioning back to the Open Trading State. Processing continues at 406.

At 406 the Matching Engine determines whether it disseminates quote or order data for the Auction Instrument through a private market data feed. If the Trading Center does disseminate such data, processing continues at 407. Otherwise processing continues at 410.

At 407 the Matching Engine temporarily suspends publishing new data for the Auction Instrument using its private data feed. Additionally the Trading Center sends new current data reflecting that no orders are present at the Trading Center for the Auction Instrument. The purpose of this is to assure that there is no visibility into the Trading Center for the duration of the SNAP Auction process until transitioning back to an Open Trading State. Processing continues at 410.

At 411 the Matching Engine temporarily suspends real-time matching of orders until transitioning back to an Open Trading State. The purpose of this is to permit orders eligible for the SNAP Auction to accumulate in the open Order Book for the Auction Instrument which result in a locked or crossed open Order Book. Processing continues at 412.

At 412 the Matching Engine cancels all orders in the open Order Book which contain the CANCEL ON SNAP AUCTION order modifier. This order modifier was created for the specific purpose of identifying which orders elected not to participate in a SNAP Auction and to cancel those orders at the start of any SNAP Auction. Processing continues at 500.

Figure 5A:
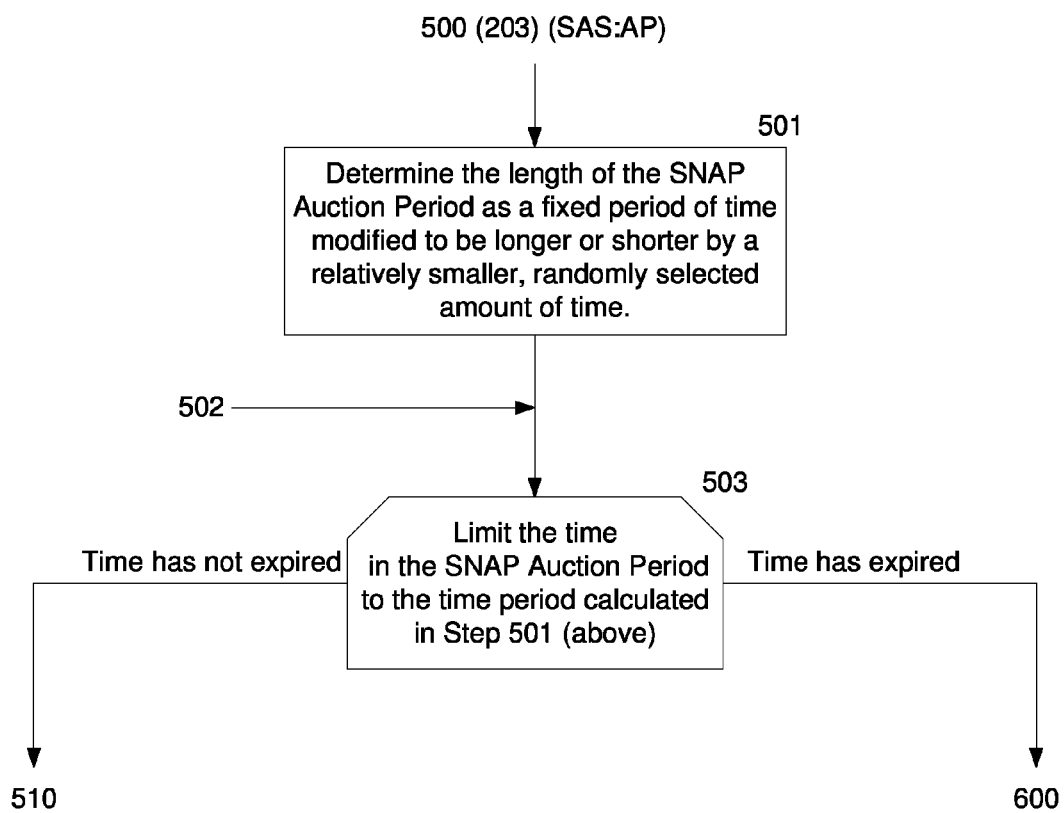
FIGS. 5A-C are parts of a flowchart that collectively illustrate the steps taken by the Matching Engine during and immediately at the end of the SNAP Auction Period.
Figure 5B:
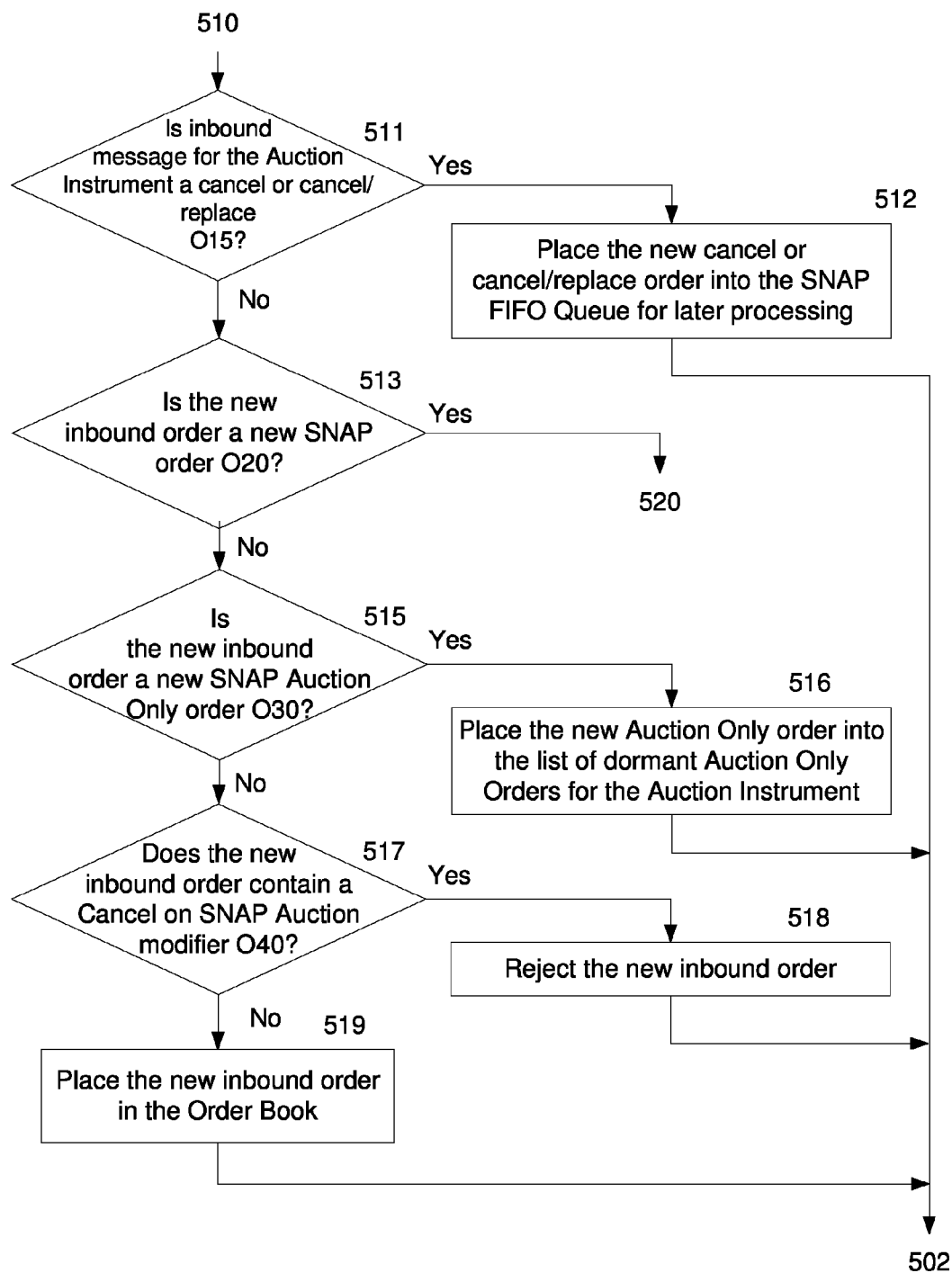
Figure 5C:
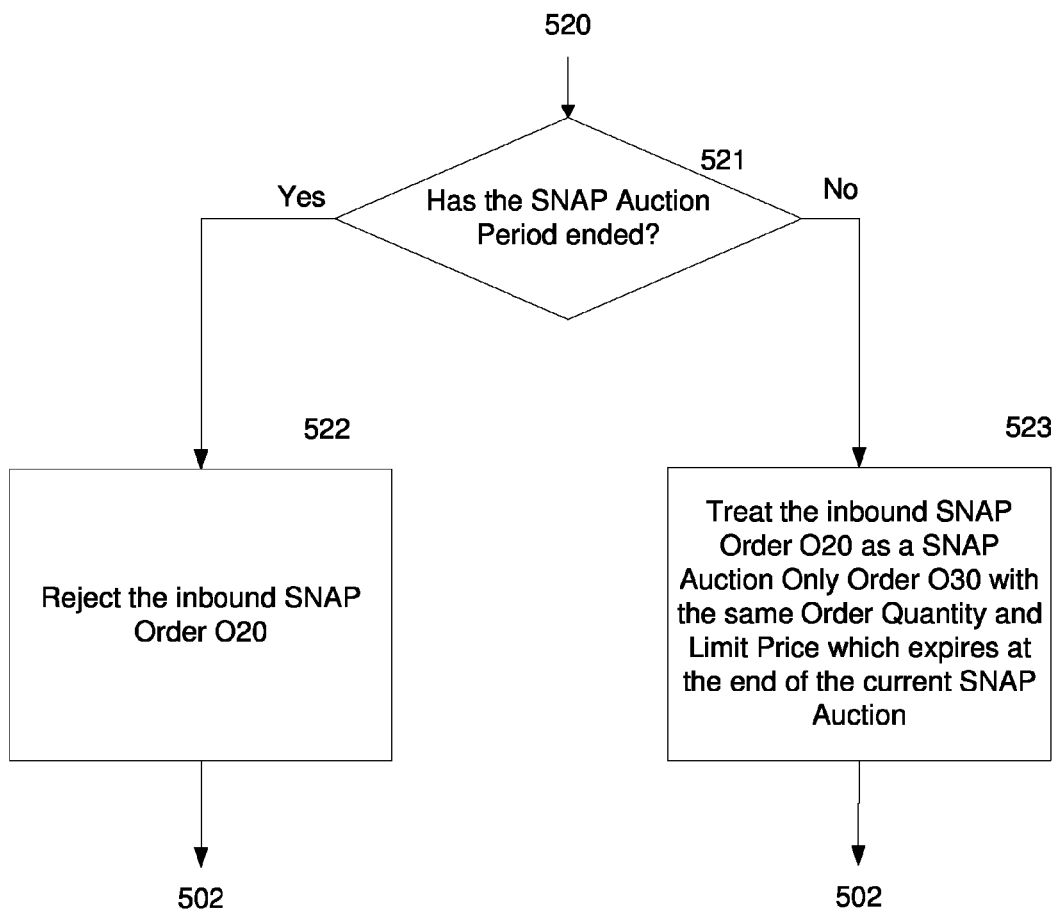

FIG. 5A, FIG. 5B, and FIG. 5C are parts of a flowchart that collectively illustrate the steps taken by the Matching Engine during and immediately at the end of the SNAP Auction Period.

FIG. 5A illustrates some of the steps the Matching Engine takes during the SNAP Auction Period.

The Trading Center must set the duration of the SNAP Auction Period. In the most general form, the duration of the SNAP Auction Period is comprised of a fixed time period element and a random variable time period element. In the most general form, the random variable time period element is a random number—positive or negative—with an absolute value which is significantly smaller than the fixed time period.

For example, the fixed time period element for an Auction Instrument might be 500 milliseconds while the random variable time period element would be randomly chosen within the range of ±50 milliseconds. At the start of a SNAP Auction, the Matching Engine determines the length of the SNAP Auction period as the sum of the fixed time period element and the random variable time period element. In this example, the SNAP Auction Period would be somewhere between 450 and 550 milliseconds.

The purpose of the random variable time period element is to create uncertainty on the part of Market Participants as to when the SNAP Auction Period will end. This uncertainty is a mechanism to address concerns the Trading Center may have about Market Participants "gaming" the SNAP Auction process.

The system has been designed to minimize, if not eliminate, gaming opportunities. During the SNAP Auction process, there is no visibility into the Trading Center for the Auction Instrument. No market data are published—no quotes, no Order Book data. When the SNAP Auction State begins, no cancel or cancel/replace messages related to the Auction Instrument are processed until the SNAP Auction is completed and the Matching Engine is transitioning to the Open Trading State. Existing orders marked CANCEL ON SNAP AUCTION are systemically cancelled by the Matching System prior to the SNAP Auction Period. However, there is no restriction to the entry of new orders. Each of these design features operates to minimize, if not eliminate, gaming of a SNAP Auction.

If, due to the abovementioned design features, a Trading Center is not concerned about gaming possibilities, then the variable time period element can be eliminated (i.e., set to zero) and the SNAP Auction Period can be a fixed time period for a given Auction Instrument.

At 501 the Matching Engine calculates the SNAP Auction Period as described above. Processing continues at 503.

At 503 the Matching Engine waits for one of two events to occur. If a new message arrives for the Auction Instrument, processing continues at 510. If the SNAP Auction Period expires, processing continues at 600.

FIG. 5B illustrates how the Matching Engine processes order, cancel, and cancel/replace messages for the Auction Instrument during the SNAP Auction Period.

At 511 the Matching Engine determines whether the new message is either a cancel or cancel/replace message. If it is either, processing continues at 512. Otherwise processing continues at 513.

At 512 the new message is either a cancel or cancel/replace message related to an order for the Auction Instrument. Handling of either of these message types is deferred during the SNAP Auction process. Therefore, the message is placed in the SNAP FIFO Queue for the Auction Instrument. Messages in this queue are processed during the transition to the Open Trading State. Processing continues at 502.

At 513 the Matching Engine determines whether the message is a new SNAP Order. If the message is a new SNAP order for the Auction Instrument, processing continues at 520. Otherwise processing continues at 515.

At 515 the Matching Engine determines whether the message is a new SNAP Auction Only Order for the Auction Instrument. If the message is a new SNAP Auction Only Order for the Auction Instrument, processing continues at 516. Otherwise processing continues at (517.

At 516 the message is a new SNAP Auction Only Order for the Auction Instrument. The Matching Engine places the message into the list of dormant (i.e., not processed and used in an auction yet) SNAP Auction Only Orders 184 for the Auction Instrument. All SNAP Auction Only Orders for the Auction Instrument will be priced and made active during the SNAP Auction Pricing Process. Processing continues at 502.

At 517 the Matching Engine determines whether the inbound message includes a CANCEL ON SNAP AUCTION modifier. If it does, processing continues at 518. Otherwise processing continues at 519.

At 518 the message includes a CANCEL ON SNAP AUCTION modifier. Since there is currently a SNAP Auction underway for the Auction Instrument, the Matching Engine immediately rejects the message. Processing continues at 502.

At 519 the message can only be a new order for the Auction. Furthermore, it cannot be a SNAP Order, a SNAP Auction Only Order, or another order with a CANCEL ON SNAP AUCTION modifier. This order should be included in the SNAP Auction currently underway. Therefore the new inbound order is placed in the Order Book for inclusion in the current SNAP Auction for the Auction Instrument. Processing continues at 502.

FIG. 5C illustrates the handing of a new SNAP Order message by the Matching Engine when a SNAP Auction is already underway for the Auction Instrument.

At 520 the Matching Engine determines what to do with a SNAP Order which is received for an Auction Instrument when a SNAP Auction is already underway for the same Auction Instrument. Processing continues at 521.

At 521 the Matching Engine determines whether the SNAP Auction already underway for the Auction Instrument has proceeded beyond the end of the SNAP Auction Period. If it has, processing continues at 522. Otherwise processing continues at 523.

At 522 the Matching Engine should reject the inbound SNAP Order because multiple, concurrent SNAP Auctions for the same Auction Instrument are not supported in this embodiment and it is too late to include the inbound SNAP Order in the SNAP Auction already underway. After the inbound SNAP Order is rejected, processing continues at 502.

At 523 the Matching Engine includes the inbound SNAP Order in the SNAP Auction already underway. To achieve this, the SNAP Order is treated as though it were an inbound SNAP Auction Only Order with the same Order Quantity and Execution Price—and scheduled the expire at the end of the current SNAP Auction. Processing continues at 502.

FIG. 6 is a flowchart that illustrates the steps taken by the Matching Engine during the SNAP Auction Pricing Process. The details of this process must be appropriate for the market structure within which each Financial Instrument is traded. The Trading Center's embodiment will, in part, be based on applicable rules and regulations (e.g., the method employed to rank orders to determine execution sequence, Satisfaction Order requirements, etc.).

At 601 the Matching Engine modifies how it handles new inbound messages.

Previously only cancel and cancel/replace orders were placed in the SNAP FIFO Queue. Commencing at this point in the SNAP Auction Cycle, all order messages for the Auction Instrument are placed in the SNAP FIFO Queue until transitioning to the Open Trading State. Processing continues at 602.

At 602 the Matching Engine determines whether there is currently a regulatory trading halt or trading pause underway which would prevent completion of the SNAP Auction. If there is no regulatory trading halt or trading pause underway, then processing continues at 603. If there is a regulatory trading halt or trading pause underway, then the SNAP Auction will not be completed, and processing continues at 900.

At 603 the Matching Engine takes a market snapshot to capture all quotation data and any other required data from other Trading Centers. The snapshot data will be used later to determine whether any Satisfaction Order are required to be sent for the current SNAP Auction. The Matching Engine captures the best displayed bid price and best displayed offer price within the Trading Center (BBO) for the Auction Instrument in pricing the Auction Only orders. Depending on the regulatory framework within which the Auction Instrument trades, this information may or may not be used at a later time in the Auction Cycle. Processing continues at 604.

At 604 the Matching Engine gathers any data required to perform any required algorithmically-calculated Limit Prices for SNAP Auction Only Orders. Processing continues at 605.

At 605 the Matching Engine activates all SNAP Auction Only Orders for the Auction Instrument. Prior to this point, all SNAP Auction Only Orders for the Auction Instrument were dormant. Each SNAP Auction Only Order must be activated, in sequence, and priced according to the instructions accompanying each SNAP Auction Only Order. Supported pricing instructions (use of a fixed Limit Price or a supported algorithmically-calculated Limit Price or algorithmically-calculated price without limit) vary based on the embodiment implemented by the Trading Center. Examples of algorithmically-calculated Limit Price calculations are discussed above under the heading ORDER MODIFIERS—SNAP AUCTION ONLY ORDER MODIFIER. Algorithmically-calculated Limit Prices may employ data gathered in the market snapshot taken in 603. As each SNAP Auction Only Order is re-priced, it is activated by placing it in the Order Book for the Auction Instrument. Processing continues at 606.

At 606 the Matching Engine calculates the SNAP Auction Price. The SNAP Auction Price is the price at which a single price auction can take place which meets any applicable regulations and rules including—but not limited to—satisfaction requirements, limit up/limit down price restrictions, and short sale restrictions. Note that Satisfaction Orders may not be executed at the Auction Price. Execution reported related to Satisfaction Orders are allocated to the highest ranked orders in the Order Book (based on price/time priority) with one exception. If the execution of a Satisfaction Order can be allocated to the SNAP Order which triggered the SNAP Auction, the SNAP Order will have the highest ranking for the purpose of allocating execution(s) of Satisfaction Orders.

In certain circumstances, there may be more than one Auction Price which meets all such requirements. In such cases, the Trading Center shall apply a consistent mechanism to select one and only one of those prices. For example, the Trading Center may elect to select the Auction Price which is closest to the midpoint of the best displayed bid and the best displayed offer and, if there are two such Auction Prices, the Trading Center may elect to choose the lower (or higher) Auction Price. Matching of all eligible orders at the Auction Price (assuming that all Satisfaction Orders will be completely executed) should result in the Order Book of the Auction Instrument being neither locked nor crossed. Processing continues at 700.

FIG. 7 is a flowchart that illustrates the steps taken by the Matching Engine during the SNAP Auction Satisfaction Period (SNAP ASP). The steps shown in FIG. 7 are only applicable if the market structure of the Financial Instrument for which a SNAP Auction occurs requires the use of Satisfaction Orders so satisfy displayed liquidity which is located at other Trading Centers. If the circumstances of a particular SNAP Auction do not require Satisfaction Orders to be sent, then the SNAP Auction Satisfaction Period ends immediately after it begins.

At 701 the Matching Engine determines whether the rules and regulations for the Auction Instrument require sending Satisfaction Orders at this time. If Satisfaction Orders are required under certain circumstances, processing continues at 702. Otherwise processing continues at 703.

At 702 the Matching Engine sends any Satisfaction Orders which are required to meet the rules and regulations for the Auction Instrument to other Trading Centers. Although rules and regulations for the Auction Instrument may require that Satisfaction Orders be sent under certain circumstances, it is possible that under the circumstances of a particular SNAP Auction there are no Satisfaction Orders which need to be sent. All Satisfaction Orders are marked as Immediate-Or-Cancel so that the receiving Trading Center will immediately cancel any portion of the Satisfaction Order which is not executed upon receipt. In certain trading regimens, it may also be appropriate to mark Satisfaction Orders as Intermarket Sweep Orders (ISO) as well. A Trading Center's embodiment will address such issues to be in compliance with all rules and regulations.

Satisfaction Orders sent at this time are part of a larger class of orders sent by the Matching Engine to other Trading Centers. This larger class of orders is called Routed Orders. Processing continues at 703.

At 703 the Matching Engine determines whether additional Routed Orders—which are not required Satisfaction Orders—should be sent to other Trading Centers. An example of an instances where additional orders would be sent when Satisfaction Orders are not required would be a situation in which there remain unexecuted shares to buy (sell) at the SNAP Auction Price which could be executed at one or more other Trading Centers. If there are such additional Routed Orders to be sent to other Trading Centers, these orders are now sent. All additional Routed Orders are marked as Immediate-Or-Cancel so that the receiving Trading Center will immediately cancel any portion of the additional order which is not executed upon receipt. In certain trading regimens, it may also be appropriate to mark Satisfaction Orders as Intermarket Sweep Orders (ISO) as well. A Trading Center's embodiment will address such issues to be in compliance with all rules and regulations. Processing continues at 704.

At 704 the Matching Engine waits until one of two things happens. A Routed Order is said to be "open" if any portion of the Routed Order remains unexecuted and that portion of the Routed Order has not been returned as cancelled by the Trading Center to which it was routed. In the first instance, if there are no open Routed Orders, processing immediately continues at 800. There is no reason to wait for additional responses to Routed Orders if other Trading Centers have fully responded to each Routed Order that was sent. There is a maximum time limit that the Matching Engine will wait for there to be no remaining open Routed Orders. In the second instance, if this maximum time limit is exceeded, processing will immediately proceed to 705 despite the fact that there remain one or more open Routed Orders.

At 705 the Matching Engine calculates the total unexecuted, uncancelled size shares, contracts, etc.—of all open Routed Orders. Since it is possible that a Routed Order will receive a subsequent (delayed) execution report, the Matching Engine reserves orders (or portions of orders) in the Order Book with the same aggregate Order Size to match against open Routed Orders in case some or all of the size in those open Routed Orders is subsequently executed. The process of reserving size from orders in the Order Book removes those orders or portions (of the size) of those orders from being eligible for matching during the SNAP Auction Matching Process. Those orders or portions of those orders are Set-aside Orders. The choice of which orders in the Order Book comprise the Set-aside Orders is determined by a method established by the Trading Center. Processing continues at 800.

Note: In a separate, parallel process, as subsequent execution reports or cancellation reports are received for the open Routed Orders, they are allocated to the Set-aside Orders. This can occur at any subsequent point in time, not just during the SNAP ASP. Eventually a response is received for all open Routed Order size which results in all Reserve Order size being either executed or cancelled. Each such trade or cancellation is reported to the party which submitted the order in the Order Book which participates in the allocation.

FIG. 8 illustrates the steps the Matching Engine takes during the SNAP Auction Order Matching Process (AOMP).

At 801 the Matching Engine allocates the execution reports for Routed Orders to orders in the Order Book. The allocation results in matching the orders selected from the Order Book at the price at which the Routed Orders were executed. The choice and sequence of orders in the Order Book to be matched in this manner is described above. Each such trade is also reported to the party which submitted the order in the Order Book which participates in the allocation. Processing continues at 802.

Executions may be done outside of AOMP. The allocation of orders occurs when the Routed Orders come back, and they may come back at any time. Here the order size that was routed is reserved so that it is not eligible for matching at this stage, although if a Routed Order is released by virtue of being canceled, then it is eligible for matching.

In more detail, when orders are routed away, each Routed Order is associated with an Auction-eligible Order that is participating in the SNAP Auction. When execution reports are received for a specific Routed Order, the execution is allocated to specific Auction-eligible Order that was associated with the Routed Order. If all or a portion of a Routed Order is returned as cancel (unexecuted), the corresponding unexecuted size of the associated Auction-eligible order is: a) eligible to participate in the SNAP Auction if the cancellation message is processed before the end of the Auction Satisfaction Period; and b) ineligible to participant in the SNAP Auction if the cancellation message is processed after the end of the Auction Satisfaction Period. If the (previously) Auction-eligible Order is a resting order eligible to be placed in the book, it is returned to the book. If the (previously) Auction-eligible Order is an Auction Only Order, then it is either cancelled or returned to the Auction Only Order Queue, depending on the terms of the AOO. Otherwise the (previously) Auction-eligible Order is cancelled.

By way of example, an order to buy 10,000 shares at a price is sent out. These shares are then reserved and cannot participate in the auction. If 1,000 of those order are filled, the 10,000 shares are still out of the auction (1,000 filled and 9,000 reserved). These orders can be filled and reported at any time. If, however, 1,000 of these shares are canceled in time to participate in the auction, then they can be made available to the auction again (9,000 reserved, and 1,000 back in for the auction). For the Matching Engine, the set-aside is this reserve (and release).

At 802 the Matching Engine matches the remaining orders in the Order Book at the SNAP Auction Price to the extent that there are sufficient contra parties to match. Each such matched trade is reported externally as a trade using the standard mechanism for trade reporting used by the Trading Center. Each such trade is also reported to the parties which submitted the orders in the Order Book which participate in the matched trade. Processing continues at 900.

Figure 9A:
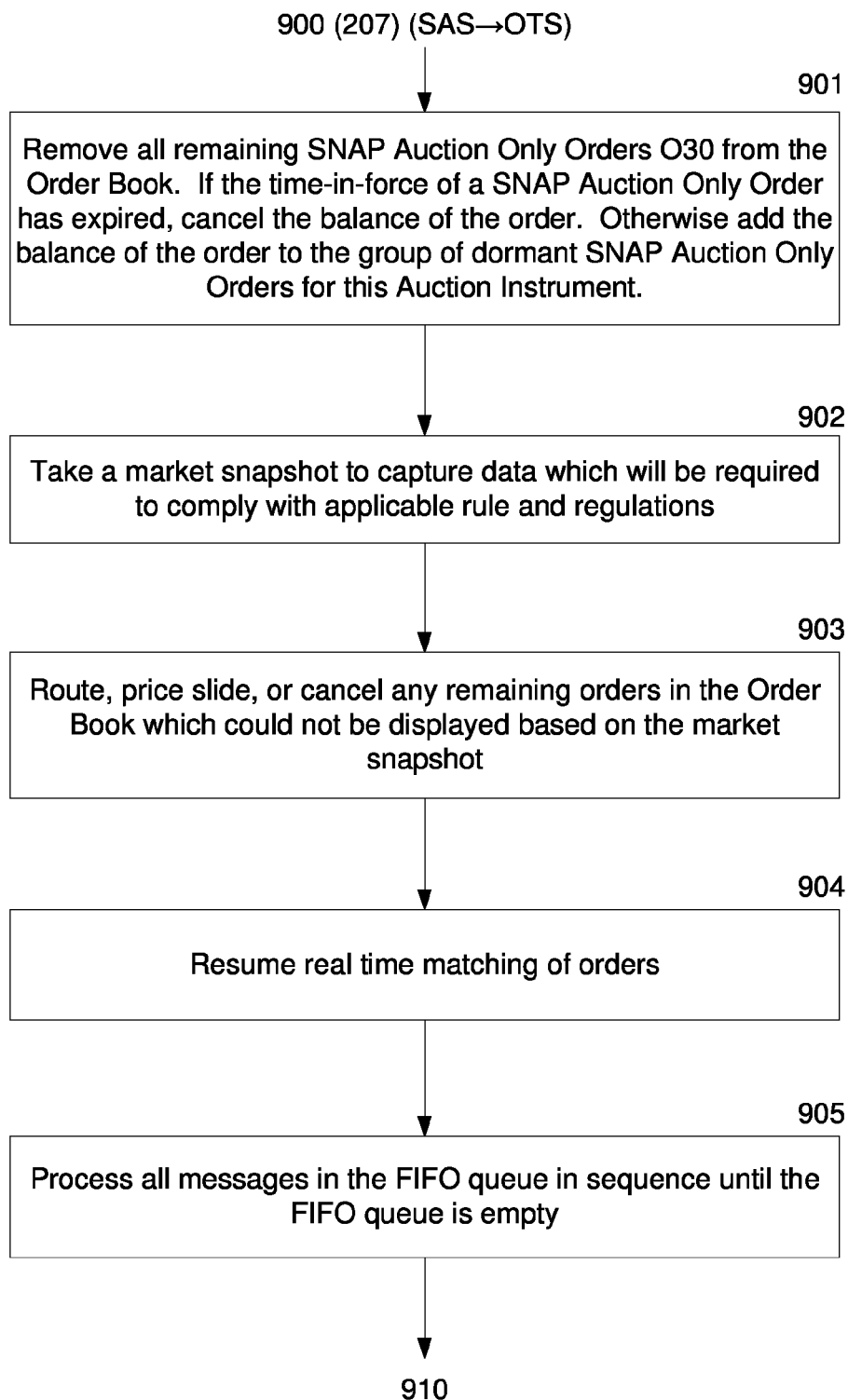
FIGS. 9A-B are parts of a flowchart that collectively illustrate a typical transition from the SNAP Auction State the Open Trading State at the end of a SNAP Auction.
Figure 9B:
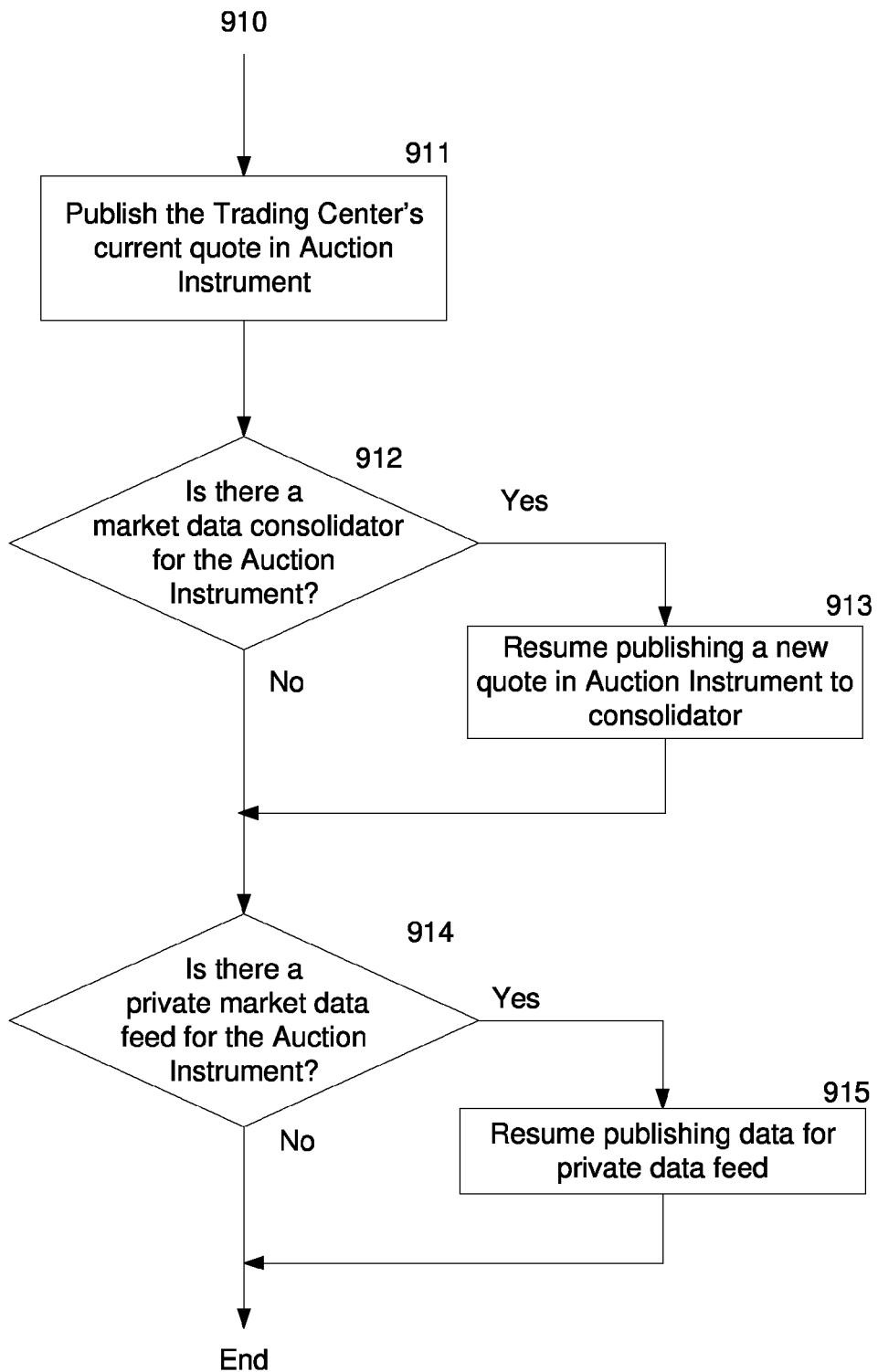

FIG. 9A and FIG. 9B are parts of a flowchart that collectively illustrate a typical transition from the SNAP Auction State (SAS) to the Open Trading State (OTS) at the end of a SNAP Auction.

FIG. 9A illustrates some of the steps the Matching Engine takes to transition from the SNAP Auction State to the Open Trading State At 901 the Matching Engine evaluates each SNAP Auction Only Order which remains in the Order Book 186. If the SNAP Auction Only Order has the SINGLE AUCTION order modifier (a "one and done" modifier), then that order is cancelled. If the SNAP Auction Only Order has the MULTIPLE AUCTION order modifier, then the unexecuted balance of the SNAP Auction Only Order is removed from the Order Book 186 and placed with dormant SNAP Auction Only Orders 184 for the Auction Instrument. Either way, the SNAP Auction Only Order is no longer active (i.e., present in the Order Book). Processing continues at 902.

At 902 the Matching Engine takes a market snapshot (if appropriate) to be used in the processing of orders in the FIFO queue. Processing continues at 903.

At 903 the Matching Engine resumes evaluates each remaining resting order in the Order Book to assure that the order can be represented and in compliance with all rules and regulations based on the market snapshot taken in 902. For each such order, (1) any order modifiers which were ignored during the SNAP Auction are reactivated, (2) if the order cannot be retained in the Order Book in compliance with rules and regulations, the order must be routed or cancelled. At the end of this process, the Order Book is neither locked nor crossed. Processing continues at 904.

At 904 the Matching Engine resumes real time matching of orders. Processing continues at 905.

At 905 the Matching Engine processes each message (order, cancellation, or cancel replace) in the FIFO queue in FIFO sequence until the FIFO queue is empty. Each message is processed as it would be during the Open Trading State, except that quotes are not published and no private data feed information is distributed related to this activity. Processing continues at 910.

FIG. 9B illustrates the final steps in which the Matching Engine completes the transition from the SNAP Auction State to the Open Trading State At 911 the Matching Engine publishes the Trading Center's quote for the Auction Instrument to the market data consolidator and once again enables automatic publication of the Trading Center's quote to the quote consolidator for the Auction Instrument which was temporarily suspended when the transition was made to the SNAP Auction State. Processing continues at 912.

At 912 the Matching Engine determines whether the Trading Center's quote for the Auction Instrument is published by a private data feed. If that is the case, processing continues at 913. Otherwise processing continues at 914.

At 913 the Matching Engine publishes the Trading Center's quote for the Auction Instrument to the private data feed and once again enables automatic publication of the Trading Center's quote to the Trading Center's private data feed for the Auction Instrument which was temporarily suspended when the transition was made to the SNAP Auction State. Processing continues at 914.

At 914 the Matching Engine determine whether the Trading Center' publishes a private market data feed for the Auction Instrument. If that is the case, processing continues at 915. Otherwise the SNAP Auction Cycle is completed.

At 915 the Matching Engine publishes all data required for the Trading Center's private market data feed to accurately reflect the current state of the Matching Engine. At this point the SNAP Auction Cycle is completed.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-volatile computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the invention may be described in terms of functional block components and various processing steps. Such functional blocks may be realized by any number of hardware and/or software components that perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, embodiments of the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

TABLE OF REFERENCE CHARACTERS 10 trading center
101, 101.x market participants
111 trading center
121, 121.x front-end servers
131 trading center inward-facing communication network
141, 141.x matching engine
151 inbound market data from a quotation and/or last sale data consolidator
152 inbound market data from private data feeds
153 manual control by trading center personnel
154 matching engine activity log data
155 outbound market data to consolidator
156 outbound market data to private data feed
157 execution reports to clearing
158 order routing to other trading centers
170 processor
180 non-volatile data store
182 SNAP queue
184 auction only orders queue
186 order book
190 communication interface
191 matching engine input
200-207 method elements for the overall SNAP auction cycle
300-343 method elements for matching engine receipt of inbound message
400-412 method elements for transition to SNAP auction state
500-523 method elements for the SNAP auction period
600-606 method elements for the SNAP auction pricing process
700-705 method elements for the SNAP auction satisfaction period
800-802 method elements for the SNAP auction order matching process
900-915 method elements for the transition to the open trading state

What is claimed is:

1. A method for executing commands using a matching engine processor comprising:
   a processor;
   a non-volatile data store comprising data and software modules; and
   an electronic communication interface comprising an input and output;
the method comprising utilizing the processor for:
   queuing, in the data store, partial commands received via the electronic communication interface that are first partial commands and second partial commands, wherein the first and second partial commands are matchable when they each comprise a common first attribute to produce an executable command that is executable by the matching engine processor;
   in a first state that is real-time:
   matching a first partial command when it is received with a corresponding second partial command having the common first attribute to produce an executable command; and
   executing the executable command;
in a second state that is not real-time and that is initiated by a second state change trigger:
   matching one or more first partial commands that have been aggregated in the data store at a time later than they were received with one or more second partial commands having the same common first attribute that have been aggregated in the data store at a time later than whey they were received to produce one or more executable commands;
   executing the executable commands using a common parameter for the executing that is set based on predetermined criteria; and
   when the second state is complete, transitioning the matching engine processor to the first state.

2. The method of claim 1, wherein the second state change trigger is receipt of a first type of first partial command that requests execution of the executable command in the second a state for a second state time period.

3. The method of claim 1, wherein the second state change trigger is existence of a predefined threshold number of first and second partial commands.

4. The method of claim 1, wherein the second state time period is targeted to be less than one second.

* * * * *

UNITED STATES PATENT AND TRADEMARK OFFICE
CERTIFICATE OF CORRECTION

| | | |
|---|---|---|
| PATENT NO. | : 9,734,533 B1 | Page 1 of 1 |
| APPLICATION NO. | : 15/178167 | |
| DATED | : August 15, 2017 | |
| INVENTOR(S) | : Steven I. Givot | |

It is certified that error appears in the above-identified patent and that said Letters Patent is hereby corrected as shown below:

On the Title Page

On page 2, in Column 1, item (56) under "Other Publications", Line 1, delete ""Auctionl" and insert --"Auction1-- therefor On page 2, in Column 2, item (56) under "Other Publications", Line 2, delete "Tail"," and insert --Fail",-- therefor In the Claims In Column 36, Line 40, in Claim 1, delete "whey" and insert --when-- therefor Signed and Sealed this
Twenty-fourth Day of April, 2018

Andrei Iancu
*Director of the United States Patent and Trademark Office*